(12) United States Patent
Sasaki

(10) Patent No.: US 6,452,743 B1
(45) Date of Patent: Sep. 17, 2002

(54) THIN-FILM MAGNETIC HEAD HAVING A MAGNETIC LAYER THAT DEFINES A THROAT HEIGHT AND A MAGNETIC LAYER THAT DEFINES A TRACK WIDTH AND METHOD OF MANUFACTURING SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 99 days.

(21) Appl. No.: 09/599,898

(22) Filed: Jun. 23, 2000

(30) Foreign Application Priority Data

Jul. 14, 1999 (JP) ............................................. 11-200367

(51) Int. Cl.[7] ................................................. G11B 5/39
(52) U.S. Cl. ...................................... 360/126; 360/317
(58) Field of Search ................................. 360/317, 126, 360/123

(56) References Cited

U.S. PATENT DOCUMENTS

| 5,438,747 A | | 8/1995 | Krounbi et al. | ............ 29/603.16 |
| 6,252,748 B1 | * | 6/2001 | Yamanaka et al. | ........... 360/317 |
| 6,278,580 B1 | * | 8/2001 | Sasaki | ........................ 360/126 |
| 6,278,591 B1 | * | 8/2001 | Chang et al. | ................ 360/317 |
| 6,289,578 B1 | * | 9/2001 | Kamijima | ................. 29/603.14 |
| 6,317,289 B1 | * | 11/2001 | Sasaki | ......................... 360/126 |
| 6,320,726 B1 | * | 11/2001 | Sasaki | ......................... 360/126 |
| 6,324,035 B2 | * | 11/2001 | Shiroishi | ..................... 360/317 |

FOREIGN PATENT DOCUMENTS

JP          A-7-262519          10/1995

* cited by examiner

*Primary Examiner*—Jefferson Evans
(74) *Attorney, Agent, or Firm*—Oliff & Berridge, PLC

(57) ABSTRACT

A recording head has a bottom pole layer and a top pole layer that include pole portions, and a recording gap layer placed between the pole portions. The recording head further has a thin-film coil placed between the bottom and top pole layers, the coil being insulated from the pole layers. The bottom pole layer includes a first layer and a second layer. The first layer is located in a region facing toward the thin-film coil, an insulating layer being placed between the first layer and the coil. The second layer includes the pole portion and is connected to a surface of the first layer facing toward the thin-film coil. The thin-film coil is located on a side of the second layer. The second layer includes a portion located closer to an air bearing surface having a width smaller than a width of the other portion located farther from the air bearing surface. That is, the second layer is T-shaped when seen from the air bearing surface.

18 Claims, 16 Drawing Sheets

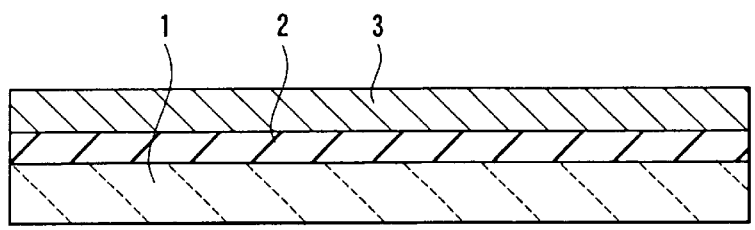 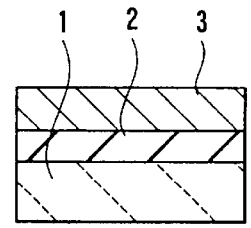
FIG. 10A　　　　　　　　　FIG. 10B
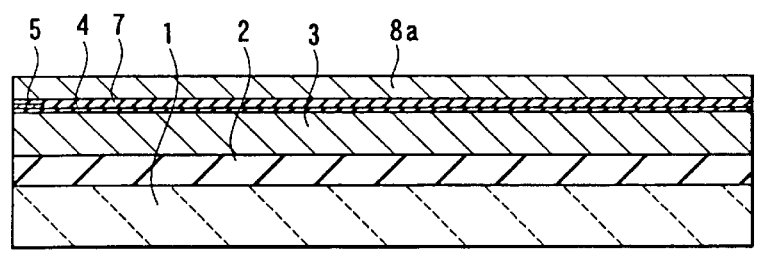 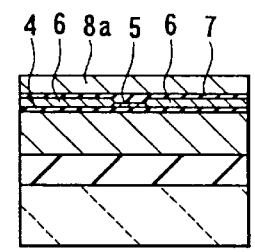
FIG. 11A　　　　　　　　　FIG. 11B

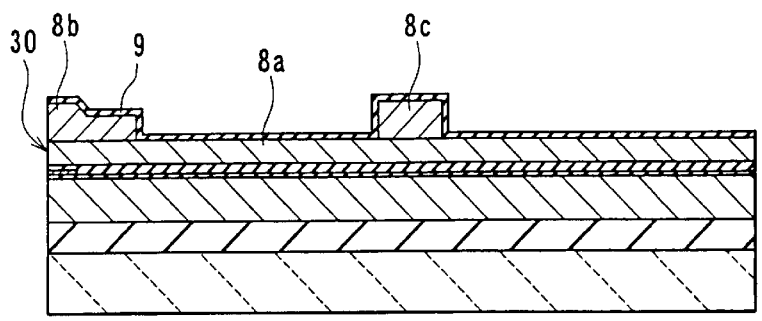
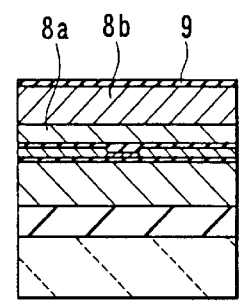
FIG. 12A          FIG. 12B
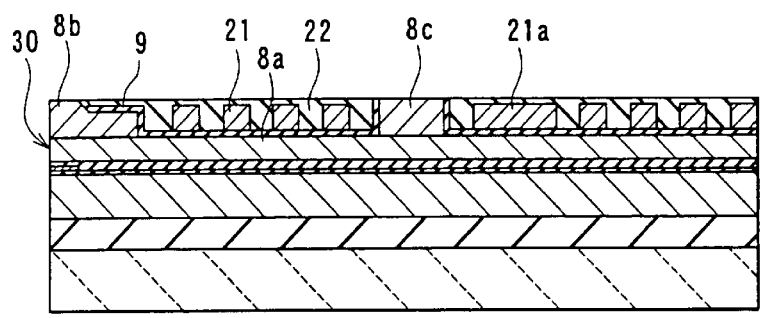
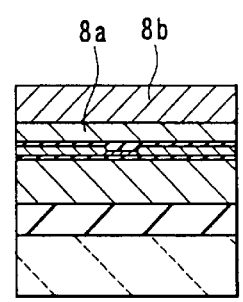
FIG. 13A          FIG. 13B

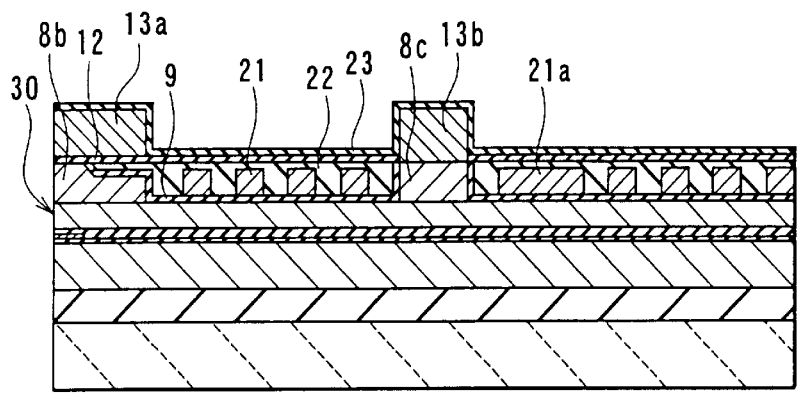 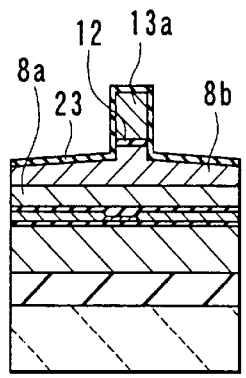
FIG. 14A · FIG. 14B
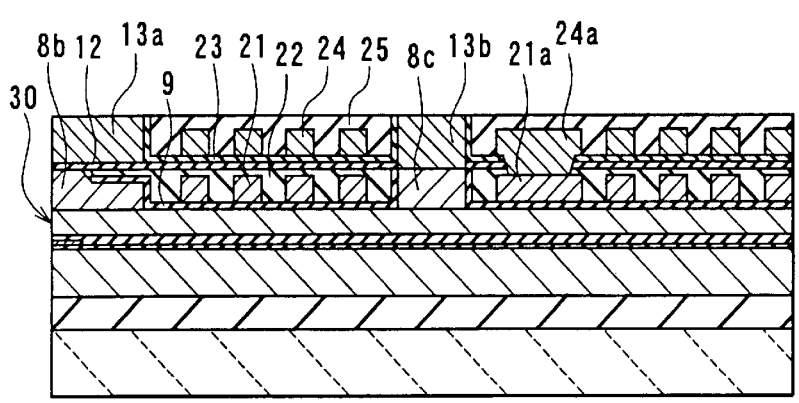 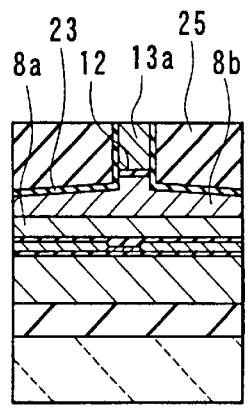
FIG. 15A · FIG. 15B

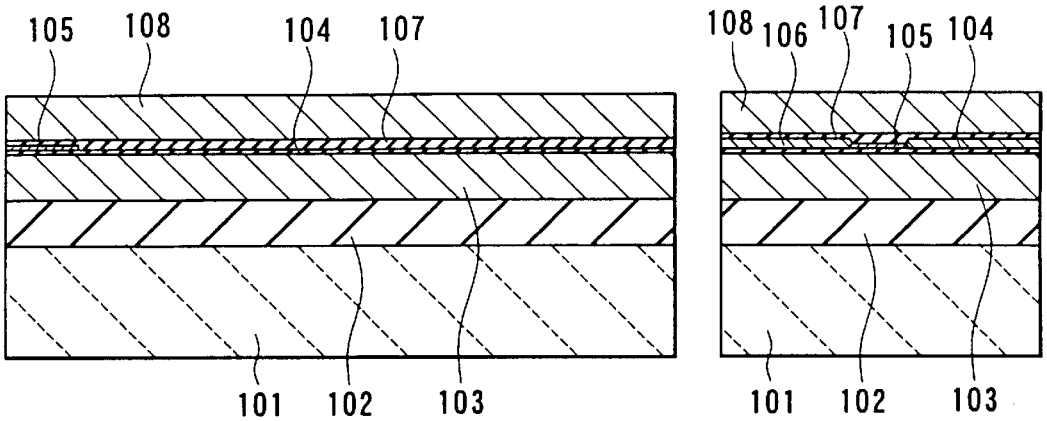
FIG. 19A
RELATED ART
FIG. 19B
RELATED ART
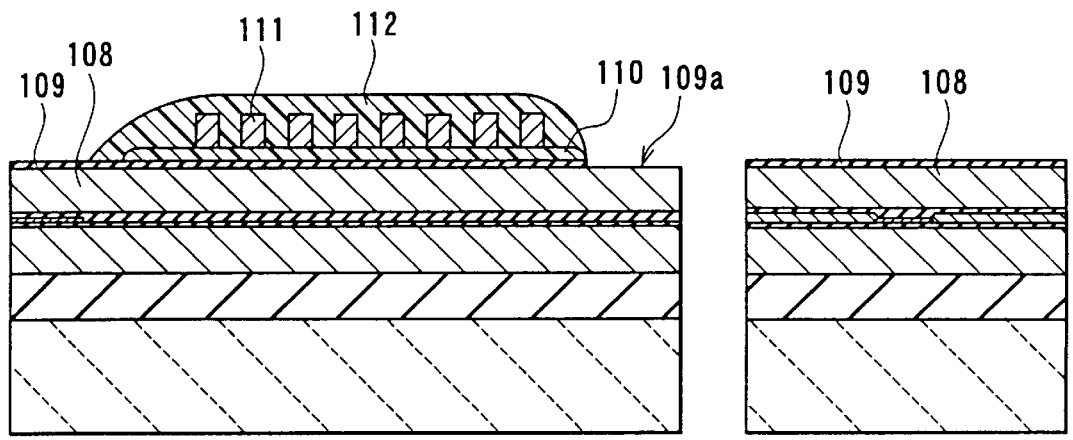
FIG. 20A
RELATED ART
FIG. 20B
RELATED ART

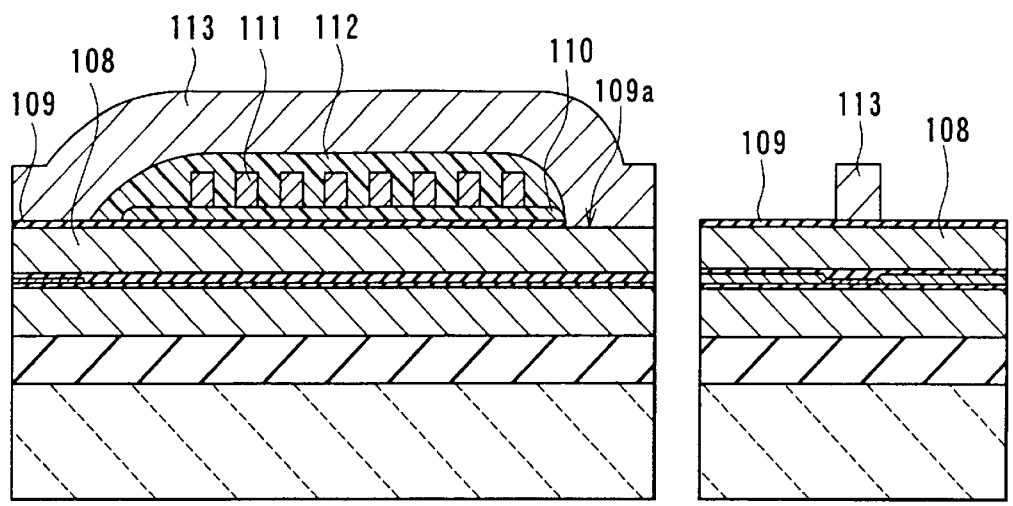
FIG. 21A
RELATED ART
FIG. 21B
RELATED ART
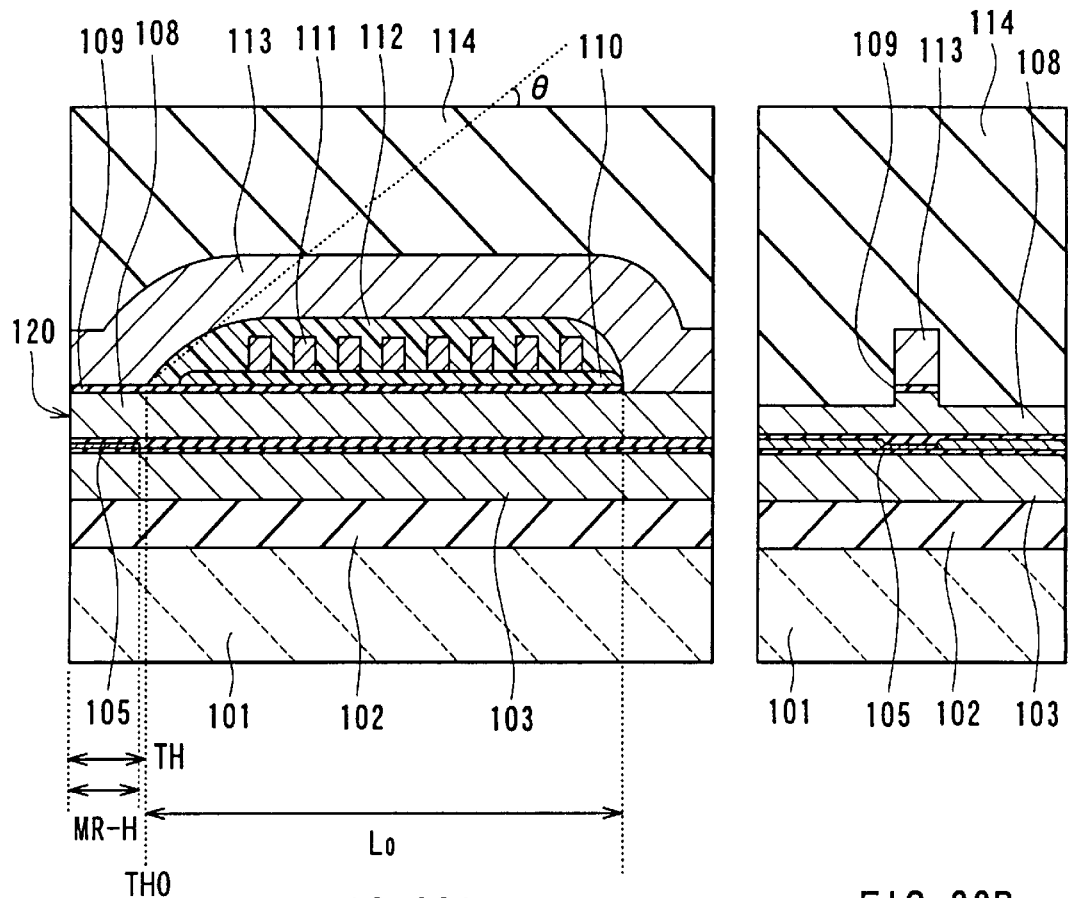
FIG. 22A
RELATED ART
FIG. 22B
RELATED ART

THIN-FILM MAGNETIC HEAD HAVING A MAGNETIC LAYER THAT DEFINES A THROAT HEIGHT AND A MAGNETIC LAYER THAT DEFINES A TRACK WIDTH AND METHOD OF MANUFACTURING SAME

BACKGROUND OF THE INVENTION

1. Field of the Invention

The present invention relates to a thin-film magnetic head having at least an induction-type magnetic transducer and to a method of manufacturing such a thin-film magnetic head.

2. Description of the Related Art

Performance improvements in thin-film magnetic heads have been sought as surface recording density of hard disk drives has increased. Such thin-film magnetic heads include composite thin-film magnetic heads that have been widely used. A composite head is made of a layered structure including a recording head having an induction-type magnetic transducer for writing and a reproducing head having a magnetoresistive (MR) element for reading.

It is required to increase the track density on a magnetic recording medium in order to increase recording density among the performance characteristics of a recording head. To achieve this, it is required to implement a recording head of a narrow track structure wherein a track width, that is, the width of top and bottom poles sandwiching the recording gap layer on a side of the air bearing surface, is reduced down to microns or the submicron order. Semiconductor process techniques are utilized to implement such a structure.

Reference is now made to FIG. 19A to FIG. 22A and FIG. 19B to FIG. 22B to describe an example of a method of manufacturing a composite thin-film magnetic head as an example of a related-art method of manufacturing a thin-film magnetic head. FIG. 19A to FIG. 22A are cross sections each orthogonal to an air bearing surface of the thin-film magnetic head. FIG. 19B to FIG. 22B are cross sections of a pole portion of the head each parallel to the air bearing surface.

In the manufacturing method, as shown in FIG. 19A and FIG. 19B, an insulating layer 102 made of alumina ($Al_2O_3$), for example, having a thickness of about 5 $\mu$m is deposited on a substrate 101 made of aluminum oxide and titanium carbide ($Al_2O_3$—TiC), for example. On the insulating layer 102 a bottom shield layer 103 made of a magnetic material is formed for making a reproducing head.

Next, on the bottom shield layer 103, alumina, for example, is deposited to a thickness of 35 to 60 nm, for example, through sputtering to form a bottom shield gap film 104 as an insulating layer. On the bottom shield gap film 104 an MR element 105 for reproduction having a thickness of tens of nanometers is formed. Next, a pair of electrode layers 106 are formed on the bottom shield gap film 104. The electrode layers 106 are electrically connected to the MR element 105.

Next, a top shield gap film 107 having a thickness of about 35 to 60 nm, for example, is formed as an insulating layer on the bottom shield gap film 104 and the MR element 105. The MR element 105 is embedded in the shield gap films 104 and 107.

Next, on the top shield gap film 107, a top-shield-layer-cum-bottom-pole-layer (called a bottom pole layer in the following description) 108 having a thickness of about 2.5 to 3.5 $\mu$m is formed. The bottom pole layer 108 is made of a magnetic material and used for both a reproducing head and a recording head.

Next, as shown in FIG. 20A and FIG. 20B, a recording gap layer 109 made of an insulating film such as an alumina film whose thickness is 0.2 to 0.25 $\mu$m, for example, is formed on the bottom pole layer 108. Next, a portion of the recording gap layer 109 is etched to form a contact hole 109a to make a magnetic path. Next, a photoresist layer 110 having a thickness of 1.0 to 1.5 $\mu$m, for example, is formed on top of a region of the recording gap layer 109 where a thin-film coil described later is to be formed. On the photoresist layer 110, the thin-film coil 111 for an induction-type recording head is formed through electrolytic plating, for example. A photoresist layer 112 is then formed to cover the thin-film coil 111.

Next, as shown in FIG. 21A and FIG. 21B, a top pole layer 113 made of a magnetic material and having a thickness of 2.0 to 3.0 $\mu$m, for example, is formed for the recording head in a region extending from the top of a portion of the recording gap layer 109 located in the pole portion, through the top of the photoresist layer 112 to the contact hole 109a.

Next, as shown in FIG. 22A and FIG. 22B, a portion of the recording gap layer 109 around the top pole layer 113 is removed and the bottom pole layer 108 is etched by only 0.3 to 0.4 $\mu$m, for example, through ion milling, for example, using the top pole layer 113 as a mask. As shown in FIG. 22B, the structure is called a trim structure wherein the sidewalls of the top pole portion (the top pole layer 113), the recording gap layer 109, and a part of the bottom pole layer 108 are formed vertically in a self-aligned manner.

Next, an overcoat layer 114 of alumina, for example, is formed to cover the top pole layer 113. Finally, lapping of the slider is performed to form the air bearing surface 120 of the thin-film magnetic head including the recording head and the reproducing head. The thin-film magnetic head is thus completed.

In FIG. 22A, the throat height is indicated with 'TH', the zero throat height position with 'TH0', the MR height with 'MR-H', and the apex angle with $\theta$. The throat height is the length (height) of pole portions, that is, portions of magnetic pole layers facing each other with a recording gap layer in between, the length between the air-bearing-surface-side end and the other end. The zero throat height position is the position of an end of a pole portion opposite to the air bearing surface. The MR height is the length (height) between the air-bearing-surface-side end of the MR element 105 and the other end. The apex is a hill-like raised portion of the coil covered with an insulating layer such as the photoresist layer 112. The apex angle is the angle formed between the top surface of the recording gap layer 109 and the slope of the apex on a side of the pole. In the thin-film magnetic head shown in FIG. 22A, zero throat height position TH0 is the position of an end of the photoresist layer 112 on a side of the air bearing surface 120.

FIG. 23 is an explanatory view for illustrating the relationship between a top view (an upper view of FIG. 23) of the main part of the thin-film magnetic head shown in FIG. 22A and FIG. 22B and a cross-sectional view (a lower view of FIG. 23) thereof. The overcoat layer 114 and some of the other insulating layers and insulating films are omitted in FIG. 23. In FIG. 23, 'P2W' indicates the recording track width.

In order to improve the performance of the thin-film magnetic head, it is important to precisely form throat height TH, MR height MR-H, and apex angle $\theta$ as shown in FIG. 22A, and recording track width P2W as shown in FIG. 23.

To achieve high surface recording density, that is, to fabricate a recording head with a narrow track structure, it has been particularly required that track width P2W fall within the submicron order of 1.0 μm or less. It is therefore required to process the top pole of the submicron order through semiconductor process techniques.

A problem is that it is difficult to form the top pole layer of small dimensions on the apex.

As disclosed in Published Unexamined Japanese Patent Application Hei 7-262519 (1995), for example, frame plating may be used as a method for fabricating the top pole layer. In this case, a thin electrode film made of Permalloy, for example, is formed by sputtering, for example, to fully cover the apex. Next, a photoresist is applied to the top of the electrode film and patterned through a photolithography process to form a frame to be used for plating. The top pole layer is then formed by plating through the use of the electrode film previously formed as a seed layer.

However, there is a difference in height between the apex and the other part, such as 7 to 10 μm or more. The photoresist whose thickness is 3 to 4 μm is applied to cover the apex. If the photoresist thickness is required to be at least 3 μm over the apex, a photoresist film having a thickness of 8 to 10 μm or more, for example, is formed below the apex since the fluid photoresist goes downward.

To implement a recording track width of the submicron order as described above, it is required to form a frame pattern having a width of the submicron order through the use of a photoresist film. Therefore, it is required to form a fine pattern of the submicron order on top of the apex through the use of a photoresist film having a thickness of 8 to 10 μm or more. However, it is extremely difficult to form a photoresist pattern having such a thickness into a reduced pattern width, due to restrictions in a manufacturing process.

Furthermore, rays of light used for exposure of photolithography are reflected off the base electrode film as the seed layer. The photoresist is exposed to the reflected rays as well and the photoresist pattern may go out of shape. It is therefore impossible to obtain a sharp and precise photoresist pattern.

In the region on the slope of the apex, in particular, the rays reflected off the base electrode film include not only vertical reflected rays but also rays in slanting directions and rays in lateral directions from the slope of the apex. As a result, the photoresist is exposed to those reflected rays of light and the photoresist pattern more greatly goes out of shape.

With regard to the track width, it is required that the amount of lapping the slider will not affect the track width.

Therefore, when the top pole layer is formed on the apex, some means is required for reducing the effect on the track width of the rays reflected off the base electrode film during exposure of the photolithography process.

The greater apex angle θ, the greater is the amount of rays of light reflected off the base electrode film moving in the slanting or lateral direction. As a result, the track width is susceptible to those reflected rays. Therefore, apex angle θ is reduced in prior art by increasing the distance between zero throat height position TH0 and the outermost end of the thin-film coil 111, for example.

A problem of a prior-art thin-film magnetic head is that it is difficult to reduce the magnetic path (yoke) length. That is, if the coil pitch is reduced, a head with a reduced yoke length is achieved and a recording head having an excellent high frequency characteristic and an excellent nonlinear transition shift (NLTS) characteristic is achieved, in particular. However, if the coil pitch is reduced to the limit, the distance between the outermost end of the coil and the zero throat height position, and the distance between the innermost end of the coil and the portion in which the top and bottom pole layers are in contact with each other are major factors that prevent a reduction in yoke length. This problem will now be described in detail.

In the thin-film magnetic head shown in FIG. 22A and FIG. 22B, for example, the thin-film coil 111 is formed on the photoresist layer 110. The neighborhood of an end of the photoresist layer 110 is rounded. In such a portion it is impossible to etch the seed layer of the coil, and the coil is thereby shorted. The thin-film is therefore required to be formed on a flat portion. Consequently, it is required that each of the outermost and innermost ends of the coil 111 is located at a certain distance from each of the outermost and innermost ends of the photoresist layer 110, respectively. Furthermore, since the photoresist layer 112 is formed to cover the coil 111, the distance between the outermost end of the coil 111 and the outermost end of the photoresist layer 112, that is, the distance between the outermost end of the coil 111 and the zero throat height position, is greater than the distance between the outermost end of the coil 111 and the outermost end of the photoresist layer 110. In addition, the distance between the innermost end of the coil 111 and the innermost end of the photoresist layer 112, that is, the distance between the innermost end of the coil 111 and the portion in which the top and bottom pole layers are in contact with each other, is greater than the distance between the innermost end of the coil 111 and the innermost end of the photoresist layer 110. The distance between the outermost end of the coil 111 and the outermost end of the photoresist layer 112, and the distance between the innermost end of the coil 111 and the innermost end of the photoresist layer 112 thus described are the factors that prevent a reduction in the yoke length.

Furthermore, the yoke length is made greater if the distance between the outermost end of the coil 111 and zero throat height position TH0 is increased in order to reduce apex angle θ as described above.

FIG. 24 is an enlarged view of portion A of FIG. 23, that is, the neighborhood of the innermost end of the thin-film coil 111. Assuming that the coil thickness is 2 to 2.5 μm, and the thickness of each of the photoresist layer 110 and a portion of the photoresist layer 112 located above the top surface of the coil 111 is 1 to 2 μm, length $d_1$ between the innermost end of the coil 111 and the innermost end of the photoresist layer 110 is required to be 3 μm, for example, as shown in FIG. 24. Length $d_2$ between the innermost end of the coil 111 and the innermost end of the photoresist layer 112 is required to be 5 μm, for example.

Furthermore, if apex angle θ is 25 to 35 degrees, the distance between the outermost end of the coil 111 and the outermost end of the photoresist layer 112 is required to be 10 μm, for example. Assuming that the thin-film coil 111 is a single-layer eight-turn coil in which the line width is 1.2 μm and the space is 0.8 μm, the portion of the yoke length corresponding to the coil 111 is 15.2 μm. In addition to this length, a length of 10 μm, for example, that is, the distance between the outermost end of the coil 111 and the outermost end of the photoresist layer 112, and a length of 5 μm, for example, that is, the distance between the innermost end of the coil 111 and the innermost end of the photoresist layer 112 are required for the yoke length. Therefore, the yoke length is 30.2 μm, for example. In the present patent application, the yoke length is the length of a portion of the pole layer except the pole portion and the contact portions, as indicated with $L_0$ in FIG. 22A. As thus described, it is difficult in the prior art to further reduce the yoke length, which prevents improvements in high frequency characteristic and NLTS.

Although the example in which the single-layer thin-film coil is formed has been described so far, the problem that it is difficult to reduce the yoke length similarly applies to the case in which a two-layer coil is formed. That is, in the prior art, the second layer of the coil is formed on the photoresist layer covering the first layer of the coil. Therefore, it is required that each of the outermost and innermost ends of the second layer of the coil is located at a certain distance from a rounded end of the photoresist layer.

OBJECT AND SUMMARY OF THE INVENTION

It is an object of the invention to provide a thin-film magnetic head and a method of manufacturing the same for achieving reductions in track width and yoke length of an induction-type magnetic transducer.

A thin-film magnetic head of the invention comprises: a medium facing surface that faces toward a recording medium; a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers. One of the magnetic layers includes: a first layer located in a region facing toward the at least part of the thin-film coil; and a second layer connected to a surface of the first layer facing toward the thin-film coil, the second layer including one of the pole portions. The second layer includes a first portion located closer to the medium facing surface and a second portion located farther from the medium facing surface. The first portion is smaller than the second portion in width. The at least part of the thin-film coil is located on a side of the second layer. The other of the magnetic layers has a portion that defines a track width. The head further comprises: an insulating layer encasing portion formed in the second layer and provided for encasing an insulating layer for defining a throat height; and the insulating layer for defining the throat height placed in the encasing portion.

A method of the invention is provided for manufacturing a thin-film magnetic head comprising: a medium facing surface that faces toward a recording medium; a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers.

The method of the invention includes the steps of: forming the first magnetic layer; forming the gap layer on the first magnetic layer; forming the second magnetic layer on the gap layer; and forming the thin-film coil such that the at least part of the coil is placed between the first and second magnetic layers, the at least part of the coil being insulated from the first and second magnetic layers. The step of forming one of the magnetic layers includes the steps of: forming a first layer located in a region facing toward the at least part of the thin-film coil; and forming a second layer connected to a surface of the first layer facing toward the thin-film coil, the second layer including one of the pole portions. The second layer is formed in the step of forming the second layer such that the second layer includes a first portion located closer to the medium facing surface and a second portion located farther from the medium facing surface, the first portion being smaller than the second portion in width. The at least part of the thin-film coil is located on a side of the second layer in the step of forming the coil. A portion that defines a track width is formed in the step of forming the other of the magnetic layers. The method further includes the steps of: forming an insulating layer encasing portion in the second layer, the encasing portion being provided for encasing an insulating layer for defining a throat height; and forming the insulating layer for defining the throat height in the encasing portion.

According to the thin-film magnetic head or the method of manufacturing the same of the invention, the throat height is defined by the insulating layer encasing portion formed in the second layer of one of the magnetic layers. The track width is defined by the other of the magnetic layers. In the invention at least a part of the thin-film coil is located on a side of the second layer. As a result, it is possible that the other of the magnetic layers that defines the track width is formed on the flat surface with accuracy. In the invention the second layer includes the first portion located closer to the medium facing surface. The first portion has the width smaller than the width of the second portion located farther from the medium facing surface. It is thereby possible to prevent an increase in effective track width. According to the invention, it is possible that an end of at least a part of the thin-film coil is located near an end of the second layer. A reduction in yoke length is thereby achieved.

According to the thin-film magnetic head or the method of manufacturing the same of the invention, an insulating layer may be further provided. The insulating layer covers the at least part of the thin-film coil located on the side of the second layer, and has a surface facing toward the gap layer that is flattened together with a surface of the second layer facing toward the gap layer.

According to the head or the method of the invention, the other of the magnetic layers may be made up of one layer.

According to the head or the method of the invention, the other of the magnetic layers may include: a pole portion layer including the other of the pole portions; and a yoke portion layer forming a yoke portion and connected to the pole portion layer. In this case, an end face of the yoke portion layer facing toward the medium facing surface may be located at a distance from the medium facing surface. The thin-film coil may include: a first layer portion located on a side of the second layer of the one of the magnetic layers; and a second layer portion located on a side of the pole portion layer of the other of the magnetic layers. In this case, a first insulating layer and a second insulating layer may be provided. The first insulating layer covers the first layer portion of the coil and has a surface facing toward the gap layer, the surface being flattened together with a surface of the second layer facing toward the gap layer. The second insulating layer covers the second layer portion of the coil and has a surface facing toward the yoke portion layer, the surface being flattened together with a surface of the pole portion layer facing toward the yoke portion layer.

According to the head or the method of the invention, the first portion of the second layer may include a portion that is closest to the gap layer and has a width equal to the track width.

According to the head or the method of the invention, a magnetoresistive element, and a first shield layer and a second shield layer may be further provided. The first and second shield layers are provided for shielding the magnetoresistive element. Portions of the first and second shield layers located in regions on a side of the medium facing surface are opposed to each other, the magnetoresistive element being placed between the portions of the shield layers.

Other and further objects, features and advantages of the invention will appear more fully from the following description.

BRIEF DESCRIPTION OF THE DRAWINGS

FIG. 10A and FIG. 10B are cross sections for illustrating a step in a method of manufacturing a thin-film magnetic head of a second embodiment of the invention.

FIG. 11A and FIG. 11B are cross sections for illustrating a step that follows FIG. 10A and FIG. 10B.

FIG. 12A and FIG. 12B are cross sections for illustrating a step that follows FIG. 11A and FIG. 11B.

FIG. 13A and FIG. 13B are cross sections for illustrating a step that follows FIG. 12A and FIG. 12B.

FIG. 14A and FIG. 14B are cross sections for illustrating a step that follows FIG. 13A and FIG. 13B.

FIG. 15A and FIG. 15B are cross sections for illustrating a step that follows FIG. 14A and FIG. 14B.

FIG. 19A and FIG. 19B are cross sections for illustrating a step in a method of manufacturing a thin-film magnetic head of related art.

FIG. 20A and FIG. 20B are cross sections for illustrating a step that follows FIG. 19A and FIG. 19B.

FIG. 21A and FIG. 21B are cross sections for illustrating a step that follows FIG. 20A and FIG. 20B.

FIG. 22A and FIG. 22B are cross sections of the related-art thin-film magnetic head.

DETAILED DESCRIPTION OF THE PREFERRED EMBODIMENTS

Preferred embodiments of the invention will now be described in detail with reference to the accompanying drawings.

[First Embodiment]

Reference is now made to FIG. 1A to FIG. 5A, FIG. 1B to FIG. 5B, and FIG. 6 to FIG. 9 to describe a thin-film magnetic head and a method of manufacturing the same of a first embodiment of the invention. FIG. 1A to FIG. 5A are cross sections each orthogonal to an air bearing surface. FIG. 1B to FIG. 5B are cross sections of the pole portion each parallel to the air bearing surface.

Figures 1A, 1B:
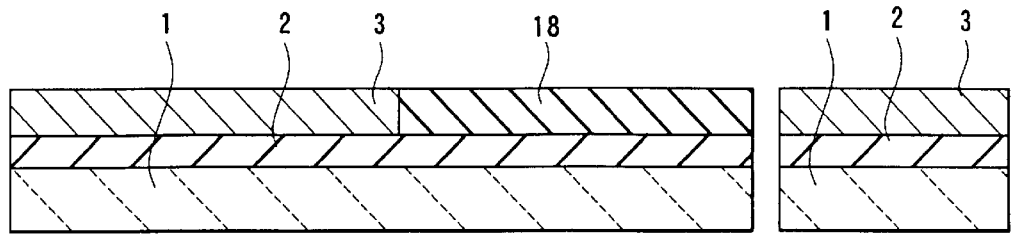
FIG. 1A and FIG. 1B are cross sections for illustrating a step in a method of manufacturing a thin-film magnetic head of a first embodiment of the invention.

In the manufacturing method, as shown in FIG. 1A and FIG. 1B, an insulating layer 2 made of alumina ($Al_2O_3$), for example, whose thickness is about 5 $\mu$m, is deposited on a substrate 1 made of aluminum oxide and titanium carbide ($Al_2O_3$—TiC), for example. On the insulating layer 2 a bottom shield layer 3 made of a magnetic material such as Permalloy and having a thickness of about 3 $\mu$m is formed for making a reproducing head. The bottom shield layer 3 is formed through plating selectively on the insulating layer 2 with a photoresist film as a mask, for example. Next, an insulating layer 18 of alumina, for example, having a thickness of about 4 to 5 $\mu$m is formed over the entire surface. This insulating layer 18 is polished through chemical mechanical polishing (CMP), for example, so that the bottom shield layer 3 is exposed, and the surface is flattened.

Figures 2A, 2B:
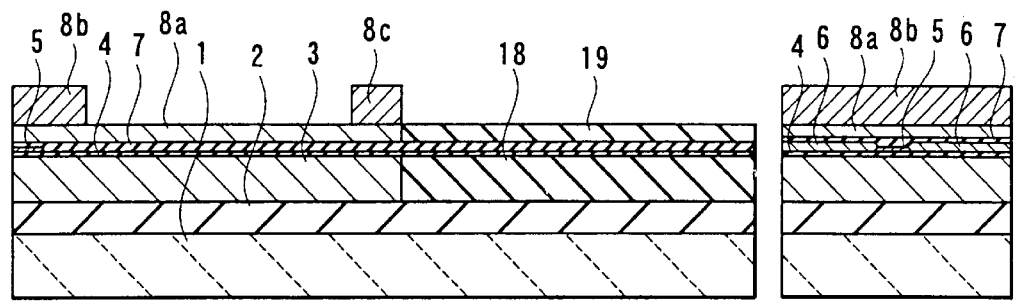
FIG. 2A and FIG. 2B are cross sections for illustrating a step that follows FIG. 1A and FIG. 1B.

Next, as shown in FIG. 2A and FIG. 2B, on the bottom shield layer 3, a bottom shield gap film 4 having a thickness of about 20 to 40 nm, for example, is formed as an insulating film. On the bottom shield gap film 4, an MR element 5 for reproduction having a thickness of tens of nanometers is formed. The MR element 5 may be fabricated through selectively etching an MR film formed through sputtering. The MR element 5 may be an element made of a magnetosensitive film exhibiting a magnetoresistivity, such as an AMR element, a GMR element, or a tunnel magnetoresistive (TMR) element. Next, on the bottom shield gap film 4, a pair of electrode layers 6 having a thickness of tens of nanometers are formed. The electrode layers 6 are electrically connected to the MR element 5. Next, a top shield gap film 7 having a thickness of about 20 to 40 nm, for example, is formed as an insulating film on the bottom shield gap film 4 and the MR element 5. The MR element 5 is embedded in the shield gap films 4 and 7. An insulation material used for the shield gap films 4 and 7 may be any of alumina, aluminum nitride, diamond-like carbon (DLC), and so on. The shield gap films 4 and 7 may be fabricated through sputtering or chemical vapor deposition (CVD). If the shield gap films 4 and 7 made of alumina films are formed through CVD, materials used are trimethyl aluminum ($Al(CH_3)_3$) and $H_2O$, for example. Through the use of CVD, it is possible to make the thin and precise shield gap films 4 and 7 with few pinholes.

Next, on the top shield gap film 7, a first layer 8a of a top-shield layer-cum-bottom-pole-layer (called a bottom pole layer in the following description) 8 having a thickness of about 1.0 to 2.0 μm is selectively formed. The bottom pole layer 8 is made of a magnetic material and used for both a reproducing head and a recording head. The bottom pole layer 8 is made up of a second layer 8b and a third layer 8c described later, in addition to the first layer 8a. The first layer 8a is placed in a region facing toward at least a part of a thin-film coil described later.

Next, an insulating layer 19 of alumina, for example, having a thickness of about 2 to 3 μm is formed over the entire surface. The insulating layer 19 is polished through CMP, for example, until the first layer 8a of the bottom pole layer 8 is exposed, and the surface is flattened.

Next, the second layer 8b and the third layer 8c of the bottom pole layer 8, each having a thickness of about 1.5 to 2.5 μm, are formed on the first layer 8a. A portion of the second layer 8b makes up a pole portion of the bottom pole layer 8 and is connected to a surface of the first layer 8a that faces toward the thin-film coil (on the upper side of the drawings). The third layer 8c is provided for connecting the first layer 8a to a top pole layer described later.

Figure 7:
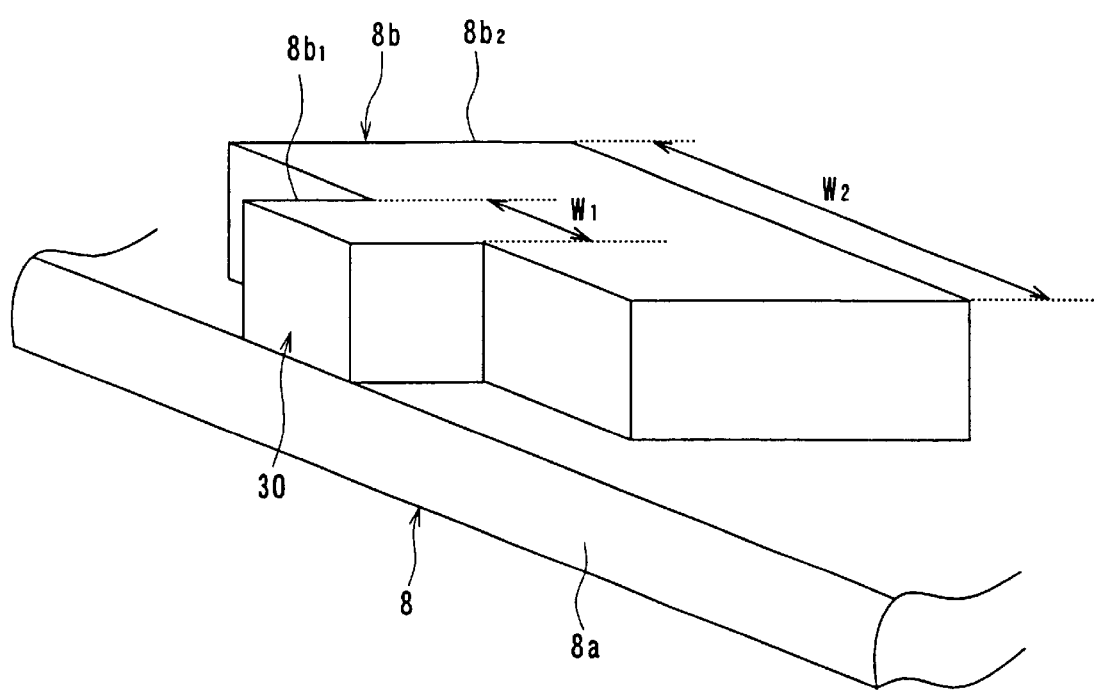
FIG. 7 is a perspective view for illustrating a step in the method of manufacturing the thin-film magnetic head of the first embodiment.

FIG. 7 is a perspective view illustrating the shape of the second layer 8b at this point in the manufacturing steps. As shown, the second layer 8b includes: a first portion $8b_1$ located on a side of the air bearing surface 30; and a second portion $8b_2$ connected to the first portion $8b_1$ and located farther from the air bearing surface 30 than the first portion $8b_1$. The first portion $8b_1$ and the second portion $8b_2$ each have a specific width $W_1$ and $W_2$, respectively. Width $W_1$ of the first portion $8b_1$ is smaller than width $W_2$ of the second portion $8b_2$. Therefore, the second layer 8b is T-shaped when seen from the air bearing surface 30. The interface between the first portion $8b_1$ and the second portion $8b_2$ (the position of the stepped portions between first portion $8b_1$ and the second portion $8b_2$) is located near the zero throat height position.

The second layer 8b and the third layer 8c of the bottom pole layer 8 may be made of NiFe (80 weight % Ni and 20 weight % Fe), or NiFe (45 weight % Ni and 55 weight % Fe) as a high saturation flux density material and formed through plating, or may be made of a material such as FeN or FeZrN as a high saturation flux density material through sputtering. Alternatively, a material such as CoFe or a Co-base amorphous material as a high saturation flux density material may be used.

Next, an etching mask (not shown) made of photoresist is formed on the second layer 8b in a region extending from a desired zero throat height position to the air bearing surface 30. Through the use of this etching mask, a portion of the top surface of the second layer 8b extending from the zero throat height position in the direction opposite to the air bearing surface 30 is etched by ion milling, for example, by only 0.3 to 0.6 μm, for example.

Figure 8:
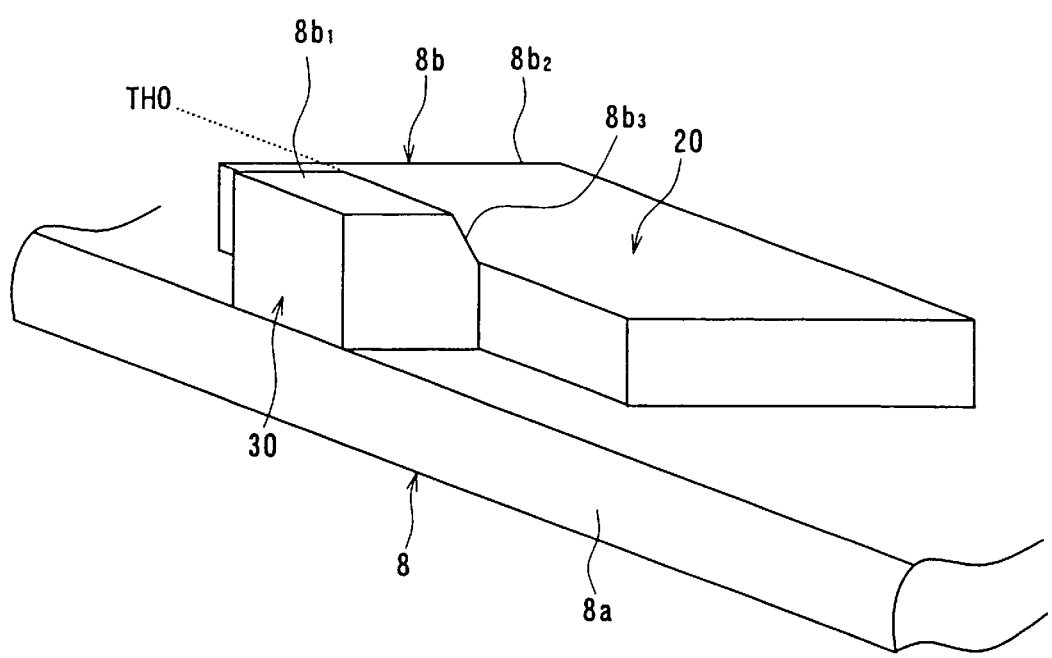
FIG. 8 is a perspective view for illustrating a step in the method of manufacturing the thin-film magnetic head of the first embodiment.

FIG. 8 is a perspective view illustrating the shape of the second layer 8b at this point in the manufacturing steps. As shown, through the etching described above, the top surface of the second layer 8b is made to have the portion extending from zero throat height position TH0 in the direction opposite to the air bearing surface 30, this portion being lower than the portion extending from zero throat height position TH0 to the air bearing surface 30. A tapered step surface $8b_3$ that defines the throat height is formed between those portions of the second layer 8b. The portion extending from zero throat height position TH0 in the direction opposite to the air bearing surface 30 is an insulating layer encasing portion 20 in which an insulating layer for defining the throat height described later is to be placed.

Figures 3A, 3B:
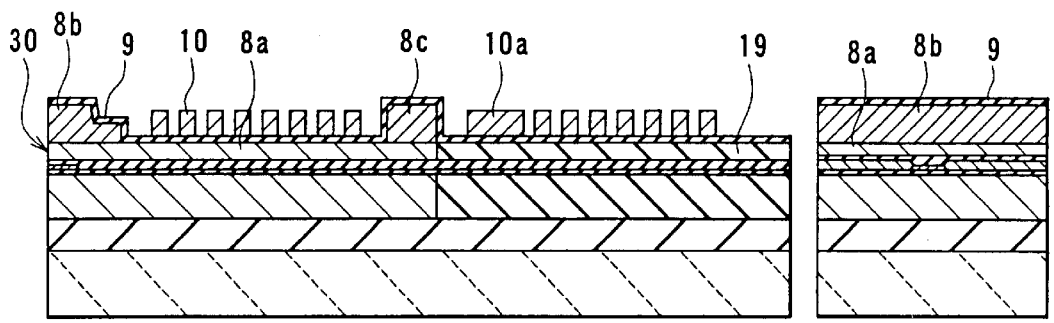
FIG. 3A and FIG. 3B are cross sections for illustrating a step that follows FIG. 2A and FIG. 2B.

Next, as shown in FIG. 3A and FIG. 3B, an insulating film 9 of alumina, for example, is formed over the entire surface. The thickness of the insulating film 9 is about 0.3 to 0.5 μm.

Next, a photoresist is patterned through a photolithography process to form a frame (not shown) for making the thin-film coil through frame plating. Next, the thin-film coil 10 made of copper (Cu), for example, is formed by frame plating through the use of this frame. For example, the thickness of the coil 10 is about 1.0 to 2.0 μm and the pitch is 1.2 to 2.0 μm. The frame is then removed. In the drawings numeral 10a indicates a portion for connecting the thin-film coil 10 to a conductive layer (lead) described later.

Figures 4A, 4B:
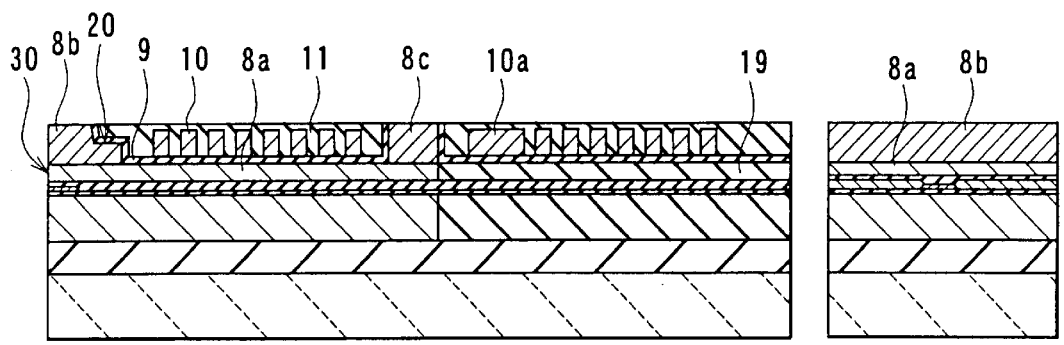
FIG. 4A and FIG. 4B are cross sections for illustrating a step that follows FIG. 3A and FIG. 3B.

Next, as shown in FIG. 4A and FIG. 4B, an insulating layer 11 of alumina, for example, having a thickness of about 3 to 4 μm is formed over the entire surface. The insulating layer 11 is then polished through CMP, for example, until the second layer 8b and the third layer 8c of the bottom pole layer 8 are exposed, and the surface is flattened. Although the thin-film coil 10 is not exposed in FIG. 4A and FIG. 4B, the coil 10 may be exposed.

At this point in the manufacturing steps, the insulating film 9 and the insulating layer 11 are placed in the insulating layer encasing portion 20. The insulating film 9 and the insulating layer 11 make up the insulating layer for defining the throat height of the invention.

Figures 5A, 5B:
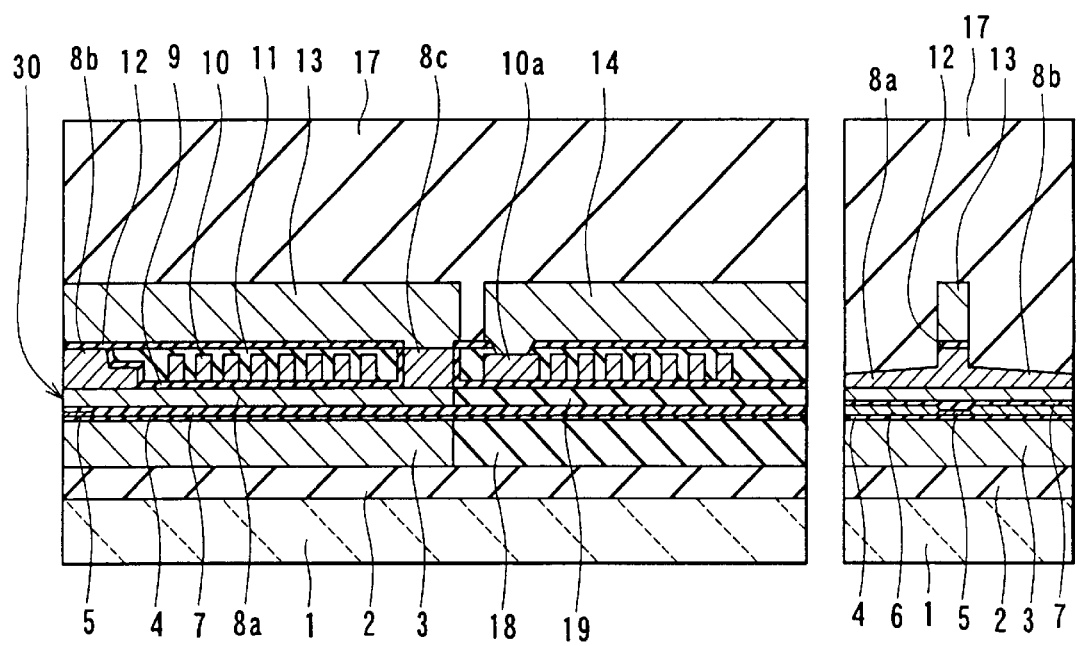
FIG. 5A and FIG. 5B are cross sections of the thin-film magnetic head of the first embodiment.

Next, as shown in FIG. 5A and FIG. 5B, a recording gap layer 12 made of an insulating material whose thickness is 0.15 to 0.25 μm, for example, is formed on the second layer 8b and the third layer 8c of the bottom pole layer 8 exposed and the insulating layer 11. In general, the insulating material used for the recording gap layer 12 may be alumina, aluminum nitride, a silicon-dioxide-base material, a silicon-nitride-base material, or diamond-like carbon (DLC) and so on. The recording gap layer 12 may be fabricated through sputtering or CVD. If the recording gap layer 12 made of an alumina film is formed through CVD, materials used are trimethyl aluminum ($Al(CH_3)_3$) and $H_2O$, for example. Through the use of CVD, it is possible to make the thin and precise recording gap layer 12 with few pinholes.

Next, a portion of the recording gap layer 12 located on top of the third layer 8c is etched to form a contact hole for making the magnetic path. Portions of the recording gap layer 12 and the insulating layer 11 located on top of the connecting portion 10a of the coil 10 are etched to form a contact hole.

Next, on the recording gap layer 12, the top pole layer 13 having a thickness of about 2.0 to 3.0 μm is formed in a region extending from the air bearing surface 30 to the portion on top of the third layer 8c of the bottom pole layer 8. In addition, the conductive layer 14 having a thickness of about 3 to 4 μm is formed. The conductive layer 14 is connected to the portion 10a of the thin-film coil 10. The top pole layer 13 is connected to the third layer 8c of the bottom pole layer 8 through the contact hole formed in the portion on top of the third layer 8c.

The top pole layer 13 may be made of NiFe (80 weight % Ni and 20 weight % Fe), or NiFe (45 weight % Ni and 55 weight % Fe) as a high saturation flux density material and formed through plating, or may be made of a material such as FeN or FeZrN as a high saturation flux density material through sputtering. Alternatively, a material such as CoFe or a Co-base amorphous material as a high saturation flux density material may be used. In order to improve the high frequency characteristic, the top pole layer 13 may be made up of layers of inorganic insulating films and magnetic layers of Permalloy, for example.

Next, the recording gap layer 12 is selectively etched through dry etching, using the top pole layer 13 as a mask. The dry etching may be reactive ion etching (RIE) using a chlorine-base gas such as $BCl_2$ or $Cl_2$, or a fluorine-base gas such as $CF_4$ or $SF_6$, for example. Next, the second layer 8b of the bottom pole layer 8 is selectively etched by about 0.3 to 0.5 $\mu$m through argon ion milling, for example. A trim structure as shown in FIG. 5B is thus formed. The trim structure suppresses an increase in the effective track width due to expansion of a magnetic flux generated during writing in a narrow track.

Next, an overcoat layer 17 of alumina, for example, having a thickness of 20 to 40 $\mu$m is formed over the entire surface. The surface of the overcoat layer 17 is then flattened and pads (not shown) for electrodes are formed on the overcoat layer 17. Finally, lapping of the slider is performed to form the air bearing surface 30 of the thin-film magnetic head including the recording head and the reproducing head. The thin-film magnetic head of the embodiment is thus completed.

In this embodiment the bottom pole layer 8 made up of the first layer 8a, the second layer 8b and the third layer 8c corresponds to a first magnetic layer of the invention. The top pole layer 13 corresponds to a second magnetic layer of the invention. The bottom shield layer 3 corresponds to a first shield layer of the invention. Since the bottom pole layer 8 also functions as the top shield layer, the bottom pole layer 8 corresponds to a second shield layer of the invention, too.

Figure 6:
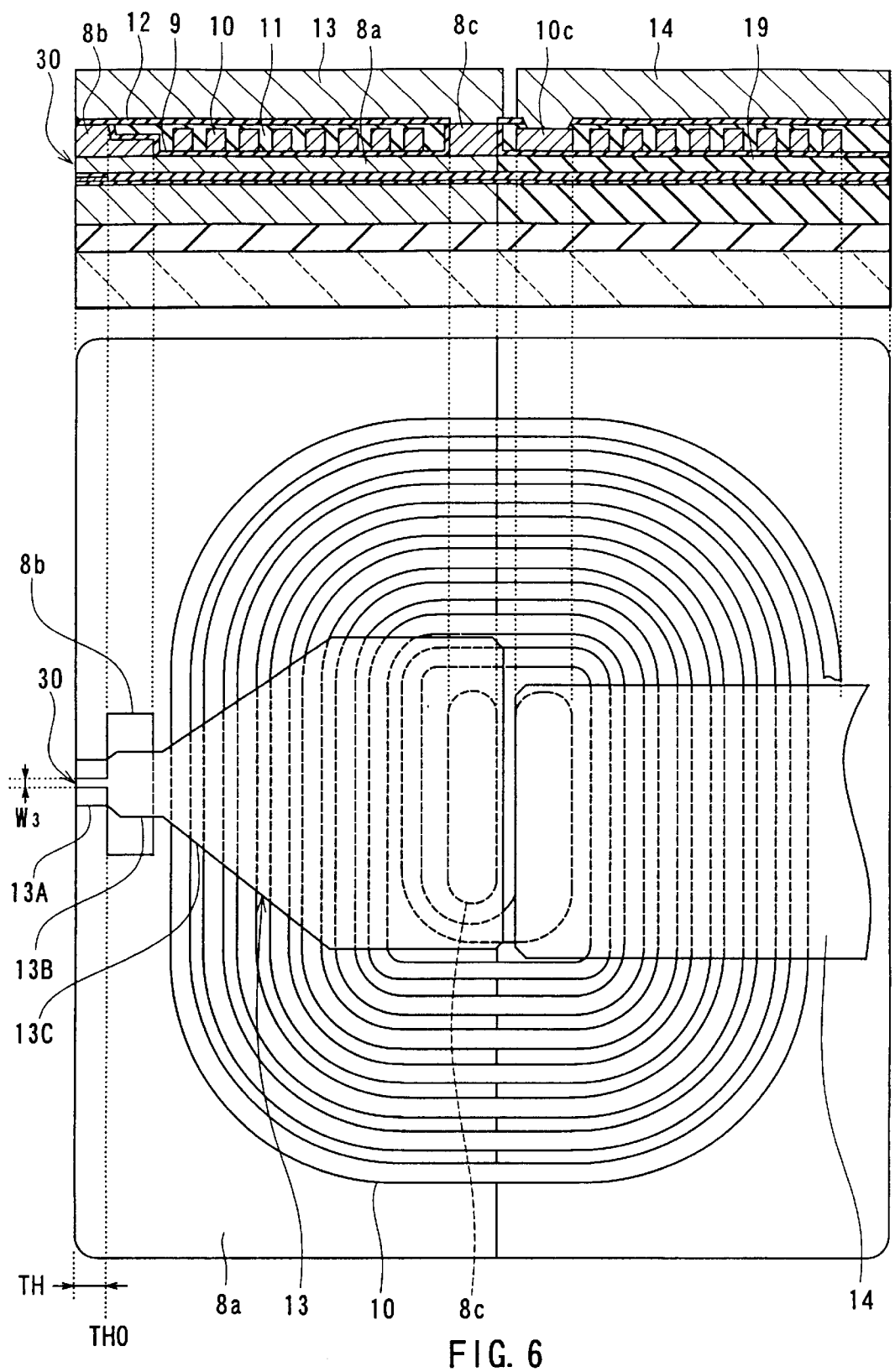
FIG. 6 is an explanatory view for illustrating the relationship between a cross-sectional view of the main part of the thin-film magnetic head of the first embodiment and a top view thereof.

FIG. 6 is an explanatory view for illustrating the relationship between a cross-sectional view (an upper view of FIG. 6) of the main part of the thin-film magnetic head of the embodiment and a top view (a lower view of FIG. 6) thereof. The overcoat layer 17 and the other insulating layers and films are omitted in FIG. 6. In FIG. 6 'TH' indicates the throat height and 'TH0' indicates the zero throat height position.

As shown in FIG. 6, the top pole layer 13 has a first portion 13A, a second portion 13B and a third portion 13C in the order in which the closest to the air bearing surface 30 comes first. The first portion 13A has a width equal to recording track width $W_3$. The second portion 13B is greater than the first portion 13A in width. The third portion 13C is greater than the second portion 13B in width. The width of the third portion 13C gradually decreases toward the air bearing surface 30. The interface between the first portion 13A and the second portion 13B (the position of the stepped portion between the first portion 13A and the second portion 13B) is located near zero throat height position TH0.

Figure 9:
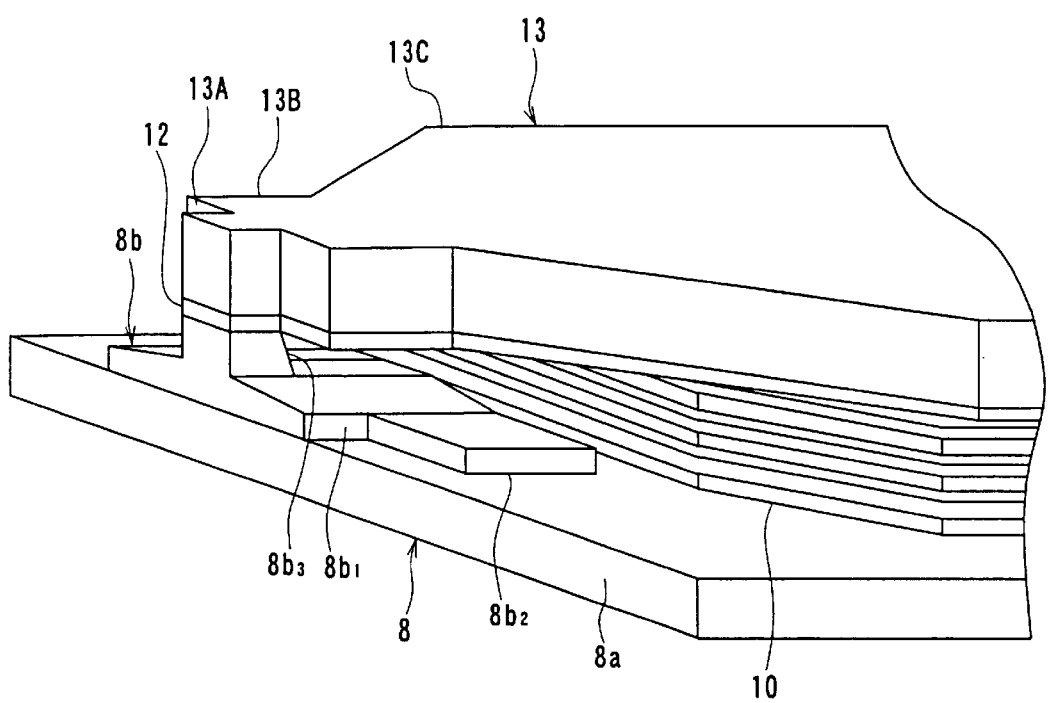
FIG. 9 is a perspective view illustrating the neighborhood of the pole portions of the thin-film magnetic head of the first embodiment.

FIG. 9 is a perspective view illustrating the neighborhood of the pole portions of the thin-film magnetic head of the embodiment. As shown, a part of the first portion $8b_1$ of the second layer 8b of the bottom pole layer 8 closest to the recording gap layer 12 has a width equal to the width of the first portion 13A of the top pole layer 13, that is, the recording track width.

As described so far, the thin-film magnetic head of the embodiment comprises the reproducing head and the recording head. The reproducing head has: the MR element 5; and the bottom shield layer 3 and the top shield layer (bottom pole layer 8) for shielding the MR element 5. Portions of the bottom shield layer 3 and the top shield layer located in a region on a side of the medium facing surface (air bearing surface 30) facing toward a recording medium are opposed to each other, the MR element 5 being placed between the portions.

The recording head has the bottom pole layer 8 (including the first layer 8a, the second layer 8b, and the third layer 8c) and the top pole layer 13 magnetically coupled to each other, each of which includes at least one layer. The bottom pole layer 8 and the top pole layer 13 include pole portions opposed to each other and placed in regions on a side of the medium facing surface. The recording head further has: the recording gap layer 12 placed between the pole portion of the bottom pole layer 8 and the pole portion of the top pole layer 13; and the thin-film coil 10 at least a part of which is placed between the bottom pole layer 8 and the top pole layer 13, the at least part of the coil 10 being insulated from the bottom pole layer 8 and the top pole layer 13.

In this embodiment the bottom pole layer 8 includes: the first layer 8a located in a region facing toward at least a part of the thin-film coil 10; and the second layer 8b connected to a surface of the first layer 8a that faces toward the coil 10 (the upper side of FIG. 5A). The second layer 8b has a portion that forms the pole portion. The second layer 8b has the first portion $8b_1$ closest to the air bearing surface 30. The first portion $8b_1$ has width $W_1$ smaller than width $W_2$ of the second portion $8b_2$ located farther from the air bearing surface 30 (as shown in FIG. 7). The coil 10 is located on a side of the second layer 8b (on the right side of FIG. 5A).

In this embodiment the insulating layer encasing portion 20 is formed in the second layer 8b of the bottom pole layer 8. The throat height is defined by the step surface $8b_3$ (as shown in FIG. 8) which is an end of the encasing portion 20 closer to the air bearing surface 30 than the other end. In the embodiment the recording track width is defined by the first portion 13A of the top pole layer 13.

According to the embodiment thus described, the throat height is defined by the insulating layer encasing portion 20 formed in the second layer 8b of the bottom pole layer 8. The recording track width is defined by the top pole layer 13. The thin-film coil 10 is located on a side of the second layer 8b. As a result, the top pole layer 13 that defines the recording track width is formed on the flat surface with accuracy. Therefore, it is possible to precisely control the recording track width even if the recording track width is reduced down to the half-micron or quarter-micron order. According to the embodiment, the second layer 8b includes the first portion $8b_1$ closest to the air bearing surface 30. The first portion $8b_1$ has the width smaller than the width of the second portion $8b_2$ located farther from the air bearing surface 30. As a result, the width of the second layer 8b measured in the air bearing surface 30 is made small, so that an increase in the effective track width is prevented. Furthermore, according to the embodiment, a part of the first portion $8b_1$ of the second layer 8b closest to the recording gap layer 12 has a width equal to the width of the first portion 13A of the top pole layer 13, that is, the recording track width. It is thereby possible to further prevent an increase in the effective track width. As thus described, the embodiment achieves a reduction in the track width of the recording head (induction-type magnetic transducer).

In the embodiment the thin-film coil 10 is located on a side of the second layer 8b of the bottom pole layer 8 and formed on the flat insulating film 9. It is thereby possible to form the thin-film coil 10 of small dimensions with accuracy. Furthermore, according to the embodiment, it is possible that an end of the coil 10 is placed near the end of the second layer 8b, since no apex exists.

As thus described, according to the embodiment, the yoke length is reduced by about 30 to 40 percent of that of a prior-art head, for example. As a result, it is possible to utilize a magnetomotive force generated by the thin-film coil 10 for writing with efficiency. It is therefore possible to provide a thin-film magnetic head having a recording head with an excellent high frequency characteristic, an excellent NLTS characteristic and an excellent overwrite property.

According to the embodiment, a reduction in yoke length is achieved. As a result, it is possible to greatly reduce the entire length of the thin-film coil 10 without changing the number of turns of the coil. The resistance of the coil 10 is thereby reduced. It is therefore possible to reduce the thickness of the coil 10.

If the entire length of the second layer 8b of the bottom pole layer 8 is equal to the throat height, and the throat height is defined by the end of the second portion 8b, the cross-sectional area of the magnetic path abruptly decreases in the portion connecting the first layer 8a to the second layer 8b. As a result, a magnetic flux may be saturated in this portion. This problem more frequently occurs when the throat height is small.

According to the embodiment, in contrast, a portion of the top surface of the second layer 8b is etched to form the insulating layer encasing portion 20. The throat height is defined by an end of the insulating layer encasing portion 20. As a result, the first layer 8a and the second layer 8b are in contact with each other in a region farther from the air bearing surface 30 than the zero throat height position, too. Therefore, according to the embodiment, it is impossible that the cross-sectional area of the magnetic path abruptly decreases in the bottom pole layer 8. As a result, saturation of a magnetic flux halfway through the magnetic path is prevented. According to the embodiment, it is thereby possible to utilize the magnetomotive force generated by the thin-film coil 10 for writing with efficiency.

According to the embodiment, the throat height is defined by an end of the insulating layer encasing portion 20 formed by etching a portion of the top surface of the second layer 8b. As a result, the throat height is controlled with more accuracy, compared to the case in which the throat height is defined by a photoresist layer covering the thin-film coil.

In this embodiment the recording gap layer 12 and the second layer 8b of the bottom pole layer 8 are etched with the top pole layer 13 as a mask to form the trim structure. This etching is performed after the photoresist mask (not shown) is formed on top of the region where etching is not required. This photoresist mask is removed after the etching is performed. Dry etching such as ashing may be utilized to remove the photoresist mask. If the thin-film coil is covered with a photoresist layer, this photoresist layer may be removed, too, if dry etching is used to remove the photoresist mask. The embodiment of the invention is free from such a problem since the thin-film coil 10 is covered with the insulating layer 11 made of an inorganic insulation material.

According to the embodiment, the insulating film 9 is provided between the second layer 8b of the bottom pole layer 8 and the thin-film coil 10. The insulating film 9 is thin and made of an inorganic insulation material that achieves sufficient insulation strength. High insulation strength is thereby obtained between the second layer 8b and the coil 10.

In the embodiment the thin-film coil 10 is covered with the insulating layer 11 made of an inorganic insulation material. It is thereby possible to prevent the pole portion from protruding toward a recording medium due to expansion resulting from heat generated around the coil 10 when the thin-film magnetic head is used.

[Second Embodiment]

Reference is now made to FIG. 10A to FIG. 16A, FIG. 10B to FIG. 16B, and FIG. 17 to describe a thin-film magnetic head and a method of manufacturing the same of a second embodiment of the invention. FIG. 10A to FIG. 16A are cross sections each orthogonal to an air bearing surface. FIG. 10B to FIG. 16B are cross sections of the pole portion each parallel to the air bearing surface.

In the manufacturing method, as shown in FIG. 10A and FIG. 10B, the insulating layer 2 made of alumina ($Al_2O_3$), for example, whose thickness is about 5 µm, is deposited on the substrate 1 made of aluminum oxide and titanium carbide ($Al_2O_3$—TiC), for example. On the insulating layer 2 a bottom shield layer 3 made of a magnetic material such as Permalloy and having a thickness of about 3 µm is formed for making a reproducing head. Next, although not shown, an insulating layer of alumina, for example, having a thickness of 4 to 5 µm, for example, is formed over the entire surface. This insulating layer is polished through CMP, for example, so that the bottom shield layer 3 is exposed, and the surface is flattened.

Next, as shown in FIG. 11A and FIG. 11B, on the bottom shield layer 3, the bottom shield gap film 4 having a thickness of about 20 to 40 nm, for example, is formed as an insulating film. On the bottom shield gap film 4, the MR element 5 for reproduction having a thickness of tens of nanometers is formed. Next, on the bottom shield gap film 4, a pair of electrode layers 6 having a thickness of tens of nanometers are formed. The electrode layers 6 are electrically connected to the MR element 5. Next, the top shield gap film 7 having a thickness of about 20 to 40 nm, for example, is formed as an insulating film on the bottom shield gap film 4 and the MR element 5. The MR element 5 is embedded in the shield gap films 4 and 7.

Next, the first layer 8a of the bottom pole layer 8 is selectively formed on the top shield gap film 7. The first layer 8a is made of a magnetic material and has a thickness of about 1.0 to 2.0 µm.

Next, as shown in FIG. 12A and FIG. 12B, the second layer 8b and the third layer 8c of the bottom pole layer 8, each having a thickness of about 1.5 to 2.5 µm, are formed on the first layer 8a. Next, a portion of the top surface of the second layer 8b extending from the zero throat height position in the direction opposite to the air bearing surface 30 is etched by ion milling, for example, by only 0.3 to 0.6 µm, for example. The shape of the second layer 8b is similar to that of the first embodiment. Next, the insulating film 9 of alumina, for example, is formed over the entire surface. The thickness of the insulating film 9 is about 0.3 to 0.5 µm.

Next, as shown in FIG. 13A and FIG. 13B, a first layer 21 of the thin-film coil made of copper, for example, is formed by frame plating. For example, the thickness of the first layer 21 is about 1.0 to 2.0 µm and the pitch is 1.2 to 2.0 µm. In the drawings numeral 21a indicates a portion for connecting the first layer 21 to a second layer of the coil described later.

Next, an insulating layer 22 of alumina, for example, having a thickness of about 3 to 4 µm is formed over the entire surface. The insulating layer 22 is then polished through CMP, for example, until the second layer 8b and the third layer 8c of the bottom pole layer 8 are exposed, and the surface is flattened. Although the first layer 21 of the coil is not exposed in FIG. 13A and FIG. 13B, the first layer 21 may be exposed.

Next, as shown in FIG. 14A and FIG. 14B, the recording gap layer 12 made of an insulating material whose thickness is 0.15 to 0.25 µm, for example, is formed on the second layer 8b and the third layer 8c of the bottom pole layer 8 exposed and the insulating layer 22.

Next, a portion of the recording gap layer 12 located on top of the third layer 8c is etched to form a contact hole for making the magnetic path.

Next, on the recording gap layer 12, a pole portion layer 13a having a thickness of 3.0 to 4.0 µm, for example, is formed. The pole portion layer 13a includes a portion that forms a pole portion of the top pole layer 13. In addition, a magnetic layer 13b having a thickness of 3.0 to 4.0 µm, for example, is formed in the contact hole provided in the portion on top of the third layer 8c of the bottom pole layer 8. The top pole layer 13 of this embodiment is made up of the pole portion layer 13a and the magnetic layer 13b, and a yoke portion layer 13c described later. The magnetic layer 13b is provided for connecting the yoke portion layer 13c to the third portion 8c of the bottom pole layer 8. In this embodiment the length of the pole portion layer 13a between an end located in the air bearing surface 30 and the other end is greater than the throat height.

The pole portion layer 13a and the magnetic layer 13b of the top pole layer 13 may be made of NiFe (80 weight % Ni and 20 weight % Fe), or NiFe (45 weight % Ni and 55 weight % Fe) as a high saturation flux density material and formed through plating, or may be made of a material such as FeN or FeZrN as a high saturation flux density material through sputtering. Alternatively, a material such as CoFe or a Co-base amorphous material as a high saturation flux density material may be used.

Next, the recording gap layer 12 is selectively etched through dry etching, using the pole portion layer 13a as a mask. The dry etching may be RIE using a chlorine-base gas such as $BCl_2$ or $Cl_2$, or a fluorine-base gas such as $CF_4$ or $SF_6$, for example. Next, the second layer 8b of the bottom pole layer 8 is selectively etched by about 0.3 to 0.5 µm through argon ion milling, for example. A trim structure as shown in FIG. 14B is thus formed.

Next, an insulating film 23 of alumina, for example, having a thickness of about 0.3 to 0.5 µm is formed over the entire surface.

Next, as shown in FIG. 15A and FIG. 15B, portions of the insulating film 23, the recording gap layer 12 and the insulating layer 22 located on top of the connecting portion 21a are etched to form a contact hole. Next, a second layer 24 of the thin-film coil made of copper, for example, is formed by frame plating. For example, the thickness of the second layer 24 is about 1.0 to 2.0 µm and the pitch is 1.2 to 2.0 µm. In the drawings numeral 24a indicates a portion for connecting the second layer 24 to the first layer 21 of the coil. In this embodiment the number of turns of each of the first layer 21 and the second layer 24 of the coil is four.

Next, an insulating layer 25 of alumina, for example, having a thickness of about 3 to 4 µm is formed over the entire surface. The insulating layer 25 is then polished through CMP, for example, so that the pole portion layer 13a and the magnetic layer 13b of the top pole layer 13 are exposed, and the surface is flattened. Although the second layer 24 is not exposed in FIG. 15A and FIG. 15B, the second layer 24 may be exposed. If the second layer 24 is exposed, another insulating layer is formed to cover the second layer 24 and the insulating layer 25.

Figure 16A:
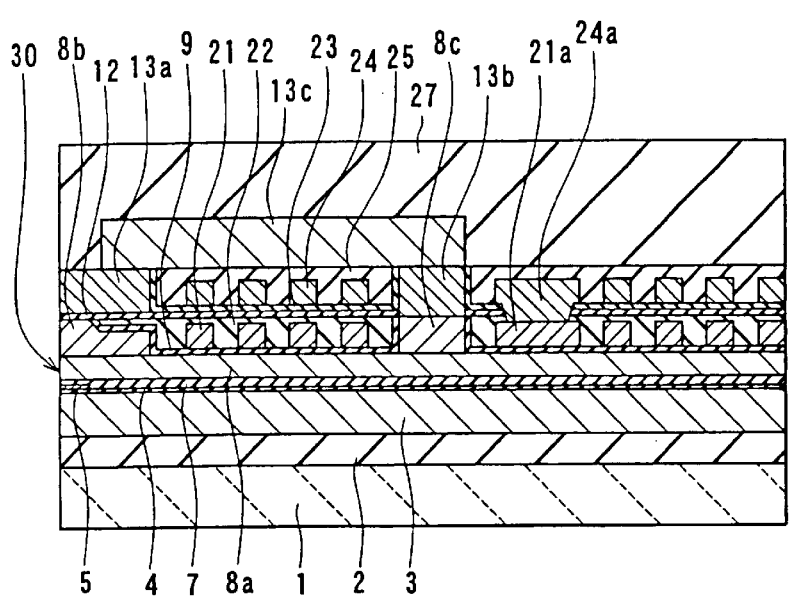
FIG. 16A and FIG. 16B are cross sections of the thin-film magnetic head of the second embodiment.
Figure 16B:
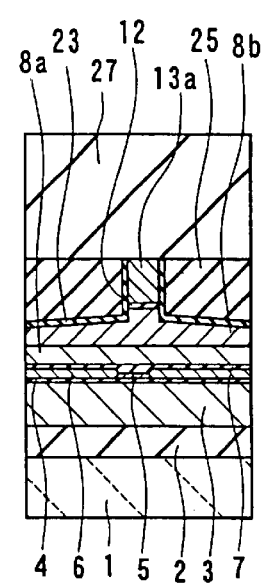

Next, as shown in FIG. 16A and FIG. 16B, the yoke portion layer 13c having a thickness of 3.0 to 4.0 µm, for example, is formed on the pole portion layer 13a and the magnetic layer 13b of the top pole layer 13 flattened and the insulating layer 25. The yoke portion layer 13c provided for the recording head is made of a magnetic material and forms a yoke portion of the top pole layer. The yoke portion layer 13c is in contact and magnetically coupled to the third layer 8c of the bottom pole layer 8 through the magnetic layer 13b. The yoke portion layer 13c may be made of NiFe (80 weight % Ni and 20 weight % Fe), or NiFe (45 weight % Ni and 55 weight % Fe) as a high saturation flux density material and formed through plating or may be made of a material such as FeN or FeZrN as a high saturation flux density material through sputtering. Alternatively, a material such as CoFe or a Co-base amorphous material as a high saturation flux density material may be used. To improve the high frequency characteristic, the yoke portion layer 13c may be made of a number of layers of inorganic insulating films and magnetic layers of Permalloy, for example.

In this embodiment an end face of the yoke portion layer 13c facing toward the air bearing surface 30 is located at a distance from the air bearing surface 30 (that is, on the right side of FIG. 16A).

Next, an overcoat layer 27 of alumina, for example, having a thickness of 20 to 40 µm is formed over the entire surface. The surface of the overcoat layer 27 is then flattened and pads (not shown) for electrodes are formed on the overcoat layer 27. Finally, lapping of the slider is performed to form the air bearing surface 30 of the thin-film magnetic head including the recording head and the reproducing head. The thin-film magnetic head of the embodiment is thus completed.

In this embodiment the top pole layer 13 made up of the pole portion layer 13a, the magnetic layer 13b and the yoke portion layer 13c corresponds to the second magnetic layer of the invention.

Figure 17:
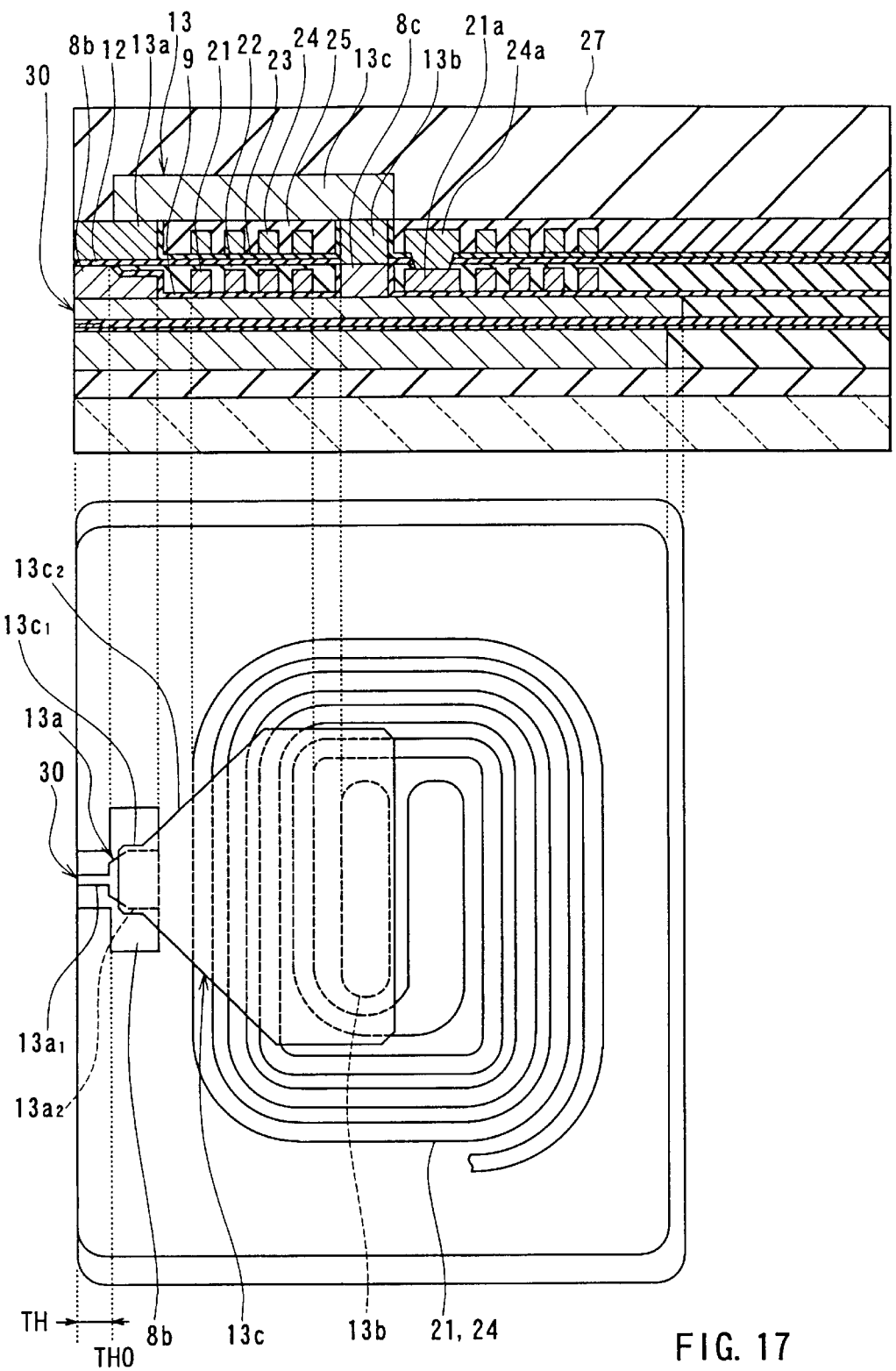
FIG. 17 is an explanatory view for illustrating the relationship between a cross-sectional view of the main part of the thin-film magnetic head of the second embodiment and a top view thereof.

FIG. 17 is an explanatory view for illustrating the relationship between a cross-sectional view (an upper view of FIG. 17) of the main part of the thin-film magnetic head of the embodiment and a top view (a lower view of FIG. 17) thereof. The overcoat layer 27 and the other insulating layers and films are omitted in the top view of FIG. 17. In FIG. 17 'TH' indicates the throat height and 'TH0' indicates the zero throat height position. As shown, the pole portion layer 13a of the top pole layer 13 includes: a first portion $13a_1$ located closer to the air bearing surface 30 and a second portion $13a_2$ coupled to the first portion $13a_1$ and located farther from the air bearing surface 30. The first portion $13a_1$ has a width equal to the recording track width. The second portion $13a_2$ is greater than the first portion $13a_1$ in width. The interface between the first portion $13a_1$ and the second portion $13a_2$ (the position of the stepped portion between the first portion $13a_1$ and the second portion $13a_2$) is located near zero throat height position TH0.

The yoke portion layer 13c of the top pole layer 13 has a first portion $13c_1$ and a second portion $13c_2$ in the order in which the closest to the air bearing surface 30 comes first. The first portion $13c_1$ is nearly equal to the second portion $13a_2$ of the pole portion layer 13a in width. The width of the second portion $13c_2$ is equal to the width of the first portion $13c_1$ at the interface between the first portion $13c_1$ and the second portion $13c_2$. The width of the second portion $13c_2$ increases from this interface with an increase in the distance from the air bearing surface 30, and the width finally becomes constant.

According to the embodiment thus described, the first layer 21 of the thin-film coil is located on a side of the second layer 8b of the bottom pole layer 8. The top surface of the insulating layer 22 covering the first layer 21 is flattened, together with the top surface of the second layer 8b. As a result, the pole portion layer 13a of the top pole layer 13 that defines the recording track width is formed on the flat surface. Therefore, according to the embodiment, it is possible to form the pole portion layer 13a with accuracy even if the recording track width is reduced down to the half-micron or quarter-micron order. A reduction in the recording track width is thus achieved.

In the embodiment the second layer 24 of the thin-film coil is located on a side of the pole portion layer 13a of the top pole layer 13. The top surface of the insulating layer 25 covering the second layer 24 is flattened, together with the top surface of the pole portion layer 13a. As a result, the yoke portion layer 13c of the top pole layer 13 is formed on the flat surface, too. It is thereby possible to form the yoke portion layer 13c of small dimensions. It is thus possible to prevent 'side write', that is, writing of data in a region of a recording medium where data is not supposed to be written.

In the embodiment an end face of the yoke portion layer 13c facing toward the air bearing surface 30 is located at a distance from the air bearing surface 30. As a result, it is impossible that the yoke portion layer 13c is exposed from the air bearing surface 30 even if the throat height is low. Side write is thereby prevented.

According to the embodiment, the length of the pole portion layer 13a between an end thereof facing toward the air bearing surface 30 and the other end is greater than the throat height. Therefore, portions of the pole portion layer 13a and the yoke portion layer 13c touch each other in the region farther from the air bearing surface 30 than the zero throat height position, too. As a result, according to the embodiment, it is impossible that the cross-sectional area of the magnetic path abruptly decreases in the top pole layer 13. It is thus possible to prevent a magnetic flux from saturating halfway through the magnetic path.

According to the embodiment, the insulating film 23 made of an inorganic material is provided between the first layer 21 and the second layer 24 of the thin-film coil, in addition to the recording gap layer 12. High insulation strength is thereby obtained between the first layer 21 and the second layer 24 of the coil. In addition, it is possible to reduce flux leakage from the layers 21 and 24 of the coil.

The remainder of the configuration, functions and effects of the embodiment are similar to those of the first embodiment.

[Third Embodiment]

Figure 18:
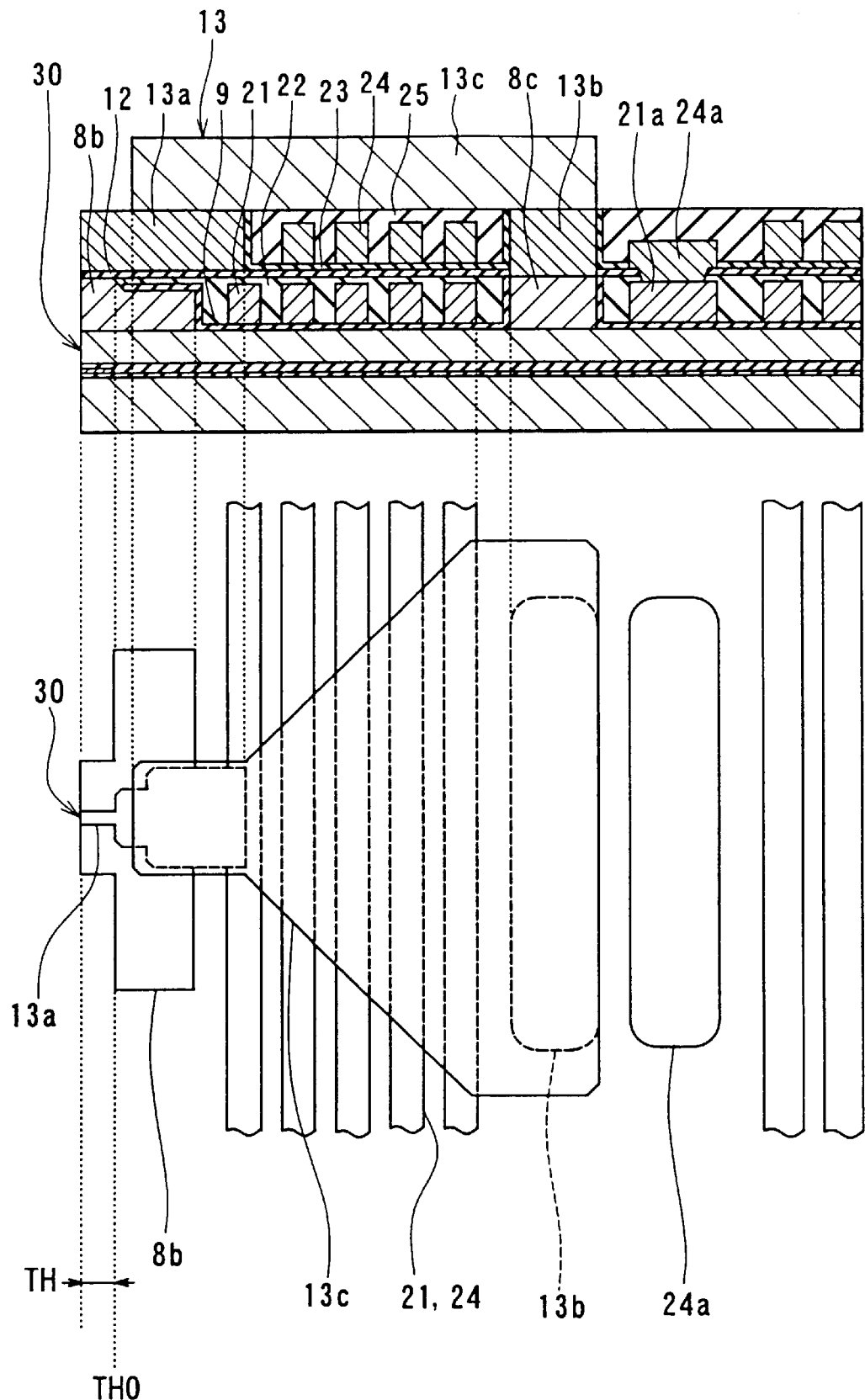
FIG. 18 is an explanatory view for illustrating the relationship between a cross-sectional view of the main part of the thin-film magnetic head of a third embodiment of the invention and a top view thereof.
Figure 23:
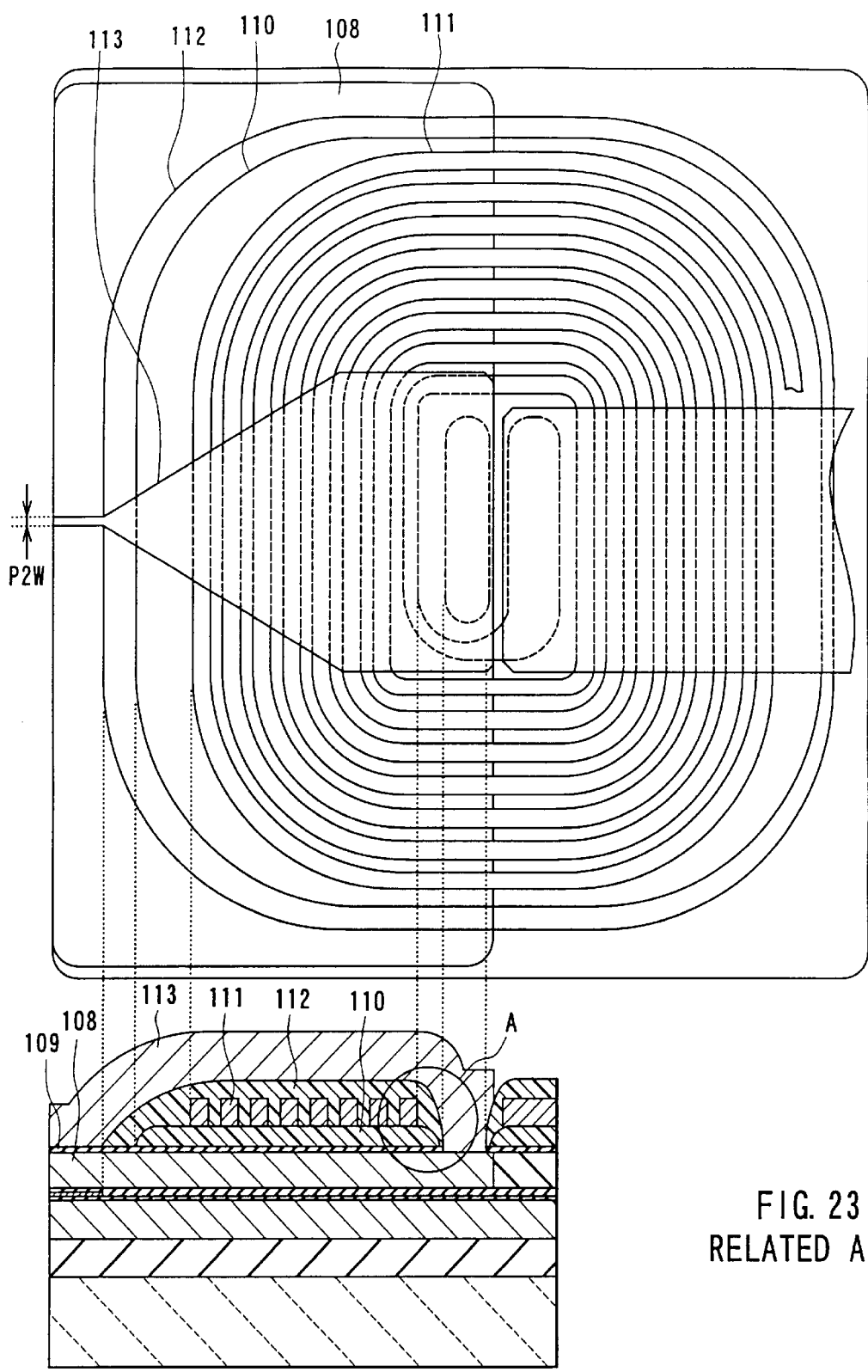
FIG. 23 is an explanatory view for illustrating the relationship between a top view of the main part of the thin-film magnetic head shown in FIG. 22A and FIG. 22B and a cross-sectional view thereof.
Figure 24:
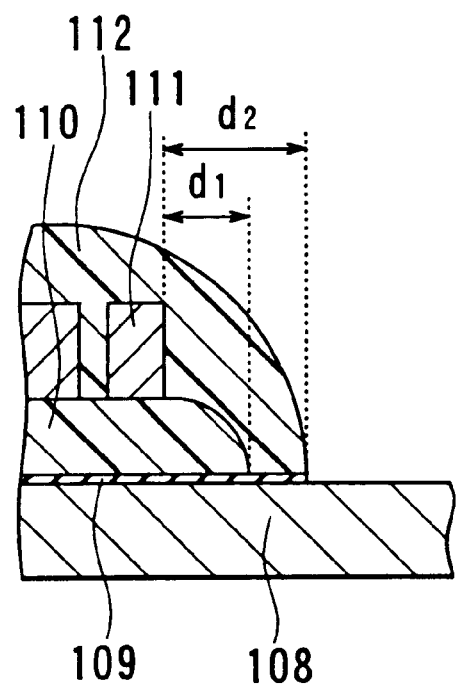
FIG. 24 is an explanatory view illustrating portion A of FIG. 23 enlarged.

Reference is now made to FIG. 18 to describe a thin-film magnetic head and a method of manufacturing the same of a third embodiment of the invention. FIG. 18 is an explanatory view for illustrating the relationship between a cross-sectional view (an upper view of FIG. 18) of the main part of the thin-film magnetic head of the embodiment and a top view (a lower view of FIG. 18) thereof. The overcoat layer and the other insulating layers and films are omitted in FIG. 18.

In this embodiment the number of turns of the second layer 24 of the thin-film coil is smaller than that of the first layer 21 of the coil while the position of the innermost end of the first layer 21 is aligned with the position of the innermost end of the second layer 24. In the example shown in FIG. 18, the number of the turns of the first layer 21 is five and that of the second layer 24 is four. Consequently, the outermost end of the second layer 24 is located farther from the air bearing surface 30 than the outermost end of the first layer 21 in this embodiment. Through the use of this arrangement, the pole portion layer 13a of the top pole layer 13 is made greater than the second layer 8b of the bottom pole layer 8 in length. Therefore, according to the third embodiment, the areas of the pole portion layer 13a and the yoke portion layer 13c touching each other are greater than those of the second embodiment. It is thus possible to more effectively prevent a magnetic flux from saturating halfway through the magnetic path in the top pole layer 13.

The remainder of the configuration, functions and effects of the embodiment are similar to those of the second embodiment.

The present invention is not limited to the foregoing embodiments but may be practiced in still other ways. In the foregoing embodiments, for example, the thin-film magnetic head is disclosed, comprising the MR element for reading formed on the base body and the induction-type magnetic transducer for writing stacked on the MR element. Alternatively, the MR element may be stacked on the magnetic transducer.

That is, the induction-type magnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with a recording gap film in between. In this case it is preferred that the top pole layer of the induction-type magnetic transducer functions as the bottom shield layer of the MR element, too.

The invention may be applied to a thin-film magnetic head dedicated to writing that has an induction-type magnetic transducer only or to a thin-film magnetic head performing writing and reading through an induction-type magnetic transducer.

According to the thin-film magnetic head or the method of manufacturing the same of the invention thus described, the throat height is defined by the insulating layer encasing portion formed in the second layer of one of the magnetic layers. The track width is defined by the other of the magnetic layers. At least a part of the thin-film coil is located on a side of the second layer. As a result, it is possible that the other of the magnetic layers that defines the track width is formed on the flat surface with accuracy. In the invention the second layer includes the first portion located closer to the medium facing surface. The first portion has the width smaller than the width of the second portion located farther from the medium facing surface. It is thereby possible to prevent an increase in effective track width. Because of those features of the invention, a reduction in the track width of the induction-type magnetic transducer is achieved. According to the invention, at least a part of the thin-film coil is located on a side of the second layer. It is therefore possible that an end of the at least part of the thin-film coil is located near an end of the second layer. A reduction in yoke length is thereby achieved.

According to the thin-film magnetic head or the method of manufacturing the same of the invention, an insulating layer may be further provided. The insulating layer covers the at least part of the thin-film coil located on the side of the second layer. A surface of the insulating layer facing toward the gap layer is flattened together with a surface of the second layer facing toward the gap layer. In this case, in particular, the magnetic layer that defines the track width is formed on the flat surface with accuracy.

According to the head or the method of the invention, the other of the magnetic layers may include the pole portion layer including the pole portion and the yoke portion layer forming the yoke portion. In addition, an end face of the yoke portion layer facing toward the medium facing surface may be located at a distance from the medium facing surface. In this case, it is possible to prevent writing of data in a region where data is not supposed to be written.

According to the head or the method of the invention, the thin-film coil may include: the first layer portion located on a side of the second layer of the one of the magnetic layers; and the second layer portion located on a side of the pole portion layer of the other of the magnetic layers. In addition, the first insulating layer and the second insulating layer may be further provided. The first insulating layer covers the first layer portion of the coil and has a surface facing toward the gap layer, the surface being flattened together with a surface of the second layer facing toward the gap layer. The second insulating layer covers the second layer portion of the coil and has a surface facing toward the yoke portion layer, the surface being flattened together with a surface of the pole portion layer facing toward the yoke portion layer. In this case, it is possible to form the yoke portion layer with accuracy.

According to the head or the method of the invention, the second layer may include a portion that is closest to the gap layer and has a width equal to the track width. In this case, it is possible to prevent an increase in effective track width.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head, comprising:
    a medium facing surface that faces toward a recording medium; a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers; wherein:
    one of the magnetic layers includes: a first layer located in a region facing toward the at least part of the thin-film coil; and a second layer connected to a surface of the first layer facing toward the thin-film coil, the second layer including one of the pole portions;
    the second layer includes a first portion located closer to the medium facing surface and a second portion located farther from the medium facing surface, the first portion being smaller than the second portion in width;
    the at least part of the thin-film coil is located on a side of the second layer;
    the other of the magnetic layers has a portion that defines a track width; and
    the second layer has a surface facing toward the gap layer, the surface having a recess for defining a throat height;
    the head further comprising:
    an insulating layer for defining the throat height placed in the recess.

2. The thin-film magnetic head according to claim 1, further comprising an insulating layer that covers the at least part of the thin-film coil located on the side of the second layer, and has a surface facing toward the gap layer that is flattened together with a surface of the second layer facing toward the gap layer.

3. The thin-film magnetic head according to claim 1 wherein the other of the magnetic layers is made up of one layer.

4. The thin-film magnetic head according to claim 1 wherein the other of the magnetic layers includes: a pole portion layer including the other of the pole portions; and a yoke portion layer forming a yoke portion and connected to the pole portion layer.

5. The thin-film magnetic head according to claim 4 wherein an end face of the yoke portion layer facing toward the medium facing surface is located at a distance from the medium facing surface.

6. The thin-film magnetic head according to claim 4 wherein the thin-film coil includes: a first layer portion located on a side of the second layer of the one of the magnetic layers; and a second layer portion located on a side of the pole portion layer of the other of the magnetic layers.

7. The thin-film magnetic head according to claim 6, further comprising: a first insulating layer that covers the first layer portion of the coil and has a surface facing toward the gap layer, the surface being flattened together with a surface of the second layer facing toward the gap layer; and a second insulating layer that covers the second layer portion of the coil and has a surface facing toward the yoke portion layer, the surface being flattened together with a surface of the pole portion layer facing toward the yoke portion layer.

8. The thin-film magnetic head according to claim 1 wherein the first portion of the second layer includes a portion that is closest to the gap layer and has a width equal to the track width.

9. The thin-film magnetic head according to claim 1, further comprising: a magnetoresistive element; and a first shield layer and a second shield layer for shielding the magnetoresistive element, portions of the first and second shield layers located in regions on a side of the medium facing surface being opposed to each other, the magnetoresistive element being placed between the portions of the shield layers.

10. A method of manufacturing a thin-film magnetic head, comprising: a medium facing surface that faces toward a recording medium; a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers; the method including the steps of:
    forming the first magnetic layer;
    forming the gap layer on the first magnetic layer;
    forming the second magnetic layer on the gap layer; and
    forming the thin-film coil such that the at least part of the coil is placed between the first and second magnetic layers, the at least part of the coil being insulated from the first and second magnetic layers; wherein:
    the step of forming one of the magnetic layers includes the steps of: forming a first layer located in a region facing toward the at least part of the thin-film coil; and forming a second layer connected to a surface of the first layer facing toward the thin-film coil, the second layer including one of the pole portions;
    the second layer is formed in the step of forming the second layer such that the second layer includes a first portion located closer to the medium facing surface and a second portion located farther from the medium facing surface, the first portion being smaller than the second portion in width;
    the at least part of the thin-film coil is located on a side of the second layer in the step of forming the coil; and
    a portion that defines a track width is formed in the step of forming the other of the magnetic layers; the method further including the steps of:

forming a recess in a surface of the second layer that faces toward the gap layer, the recess being provided for defining a throat height; and placing an insulating layer for defining the throat height in the recess.

11. The method according to claim 10 wherein the one of the magnetic layers is the first magnetic layer and the other of the magnetic layers is the second magnetic layer; the method further including the step of:

forming man insulating layer that covers the at least part of the thin-film coil located on the side of the second layer, and has a surface that faces toward the gap layer and is flattened together with a surface of the second layer facing toward the gap layer.

12. The method according to claim 10 wherein the other of the magnetic layers is made up of one layer.

13. The method according to claim 10 wherein the step of forming the other of the magnetic layers includes formation of: a pole portion layer including the other of the pole portions; and a yoke portion layer forming a yoke portion and connected to the pole portion layer.

14. The method according to claim 13 wherein an end face of the yoke portion layer facing toward the medium facing surface is located at a distance from the medium facing surface in the step of forming the other of the magnetic layers.

15. The method according to claim 13 wherein the step of forming the thin-film coil includes formation of: a first layer portion located on a side of the second layer of the one of the magnetic layers; and a second layer portion located on a side of the pole portion layer of the other of the magnetic layers.

16. The method according to claim 15 wherein the one of the magnetic layers is the first magnetic layer and the other of the magnetic layers is the second magnetic layer; the method further including the steps of forming forming a first insulating layer that covers the first layer portion of the coil and has a surface facing toward the gap layer, the surface being flattened together with a surface of the second layer facing toward the gap layer; and forming a second insulating layer that covers the second layer portion of the coil and has a surface facing toward the yoke portion layer, the surface being flattened together with a surface of the pole portion layer facing toward the yoke portion layer.

17. The method according to claim 10 wherein the first portion of the second layer is formed to include a portion that is closest to the gap layer and has a width equal to the track width.

18. The method according to claim 10, further including the step of forming: a magnetoresistive element; and a first shield layer and a second shield layer for shielding the magnetoresistive element, portions of the first and second shield layers located in regions on a side of the medium facing surface being opposed to each other, the magnetoresistive element being placed between the portions of the shield layers.

* * * * *

UNITED STATES PATENT AND TRADEMARK OFFICE
CERTIFICATE OF CORRECTION

PATENT NO.    : 6,452,743 B1
DATED         : September 17, 2002
INVENTOR(S)   : Yoshitaka Sasaki It is certified that error appears in the above-identified patent and that said Letters Patent is hereby corrected as shown below:

<u>Column 21,</u>
Line 10, remove "man" and replace with -- an --.

<u>Column 22,</u>
Line 6, remove "forming" and replace with -- : --

Signed and Sealed this

Eighteenth Day of February, 2003

JAMES E. ROGAN
*Director of the United States Patent and Trademark Office*